United States Patent [19]
Ohsaki et al.

[11] Patent Number: 5,985,489
[45] Date of Patent: *Nov. 16, 1999

[54] CARBON FOR A LITHIUM SECONDARY BATTERY, LITHIUM SECONDARY BATTERY, AND MANUFACTURING METHODS THEREFOR

[75] Inventors: Takushi Ohsaki; Ryuichi Yazaki; Hiroshi Taira; Takashi Inui; Mitsuo Kigure; Akihiro Nakamura, all of Kitakoma-gun, Japan

[73] Assignee: Nippon Sanso Corporation, Tokyo, Japan

[*] Notice: This patent is subject to a terminal disclaimer.

[21] Appl. No.: 08/776,609

[22] PCT Filed: Jun. 19, 1996

[86] PCT No.: PCT/JP96/01684

§ 371 Date: Feb. 20, 1997

§ 102(e) Date: Feb. 20, 1997

[87] PCT Pub. No.: WO97/01192

PCT Pub. Date: Jan. 9, 1997

[30] Foreign Application Priority Data

Jun. 20, 1995 [JP] Japan ................................. 7-153702
Oct. 17, 1995 [JP] Japan ................................. 7-268771
Jan. 24, 1996 [JP] Japan ................................. 8-10442

[51] Int. Cl.$^6$ ............................................ H01M 4/60
[52] U.S. Cl. ............................ 429/231.7; 429/231.8
[58] Field of Search .............................. 429/218, 231.8, 429/231.7; 423/445 R, 449.4

[56] References Cited

U.S. PATENT DOCUMENTS

| | | | |
|---|---|---|---|
| 5,238,760 | 8/1993 | Takahashi et al. | 429/194 |
| 5,658,692 | 8/1997 | Ohsaki et al. | 429/218 |
| 5,756,062 | 5/1998 | Greinke et al. | 423/449.4 |
| 5,772,974 | 6/1998 | Ohashi et al. | 423/447.7 |

FOREIGN PATENT DOCUMENTS

| | | |
|---|---|---|
| 61-218060 | 9/1986 | Japan . |
| 2-66856 | 3/1990 | Japan . |
| 2-230660 | 9/1990 | Japan . |
| 3-245473 | 11/1991 | Japan . |
| 5-89879 | 4/1993 | Japan . |
| 5-144440 | 6/1993 | Japan . |
| 5-182668 | 7/1993 | Japan . |
| 5-335017 | 12/1993 | Japan . |
| 6-187972 | 7/1994 | Japan . |

*Primary Examiner*—Maria Nuzzolillo
*Assistant Examiner*—Jennifer O'Malley
*Attorney, Agent, or Firm*—Oblon, Spivak, McClelland, Maier & Neustadt, P.C.

[57] ABSTRACT

A superior lithium secondary battery having high total discharge capacity, high effective discharge capacity, high total discharge efficiency, and high effective discharge rate can be obtained by using, as a carbon electrode for a lithium secondary battery, a carbon for a lithium secondary battery obtained by successively conducting a halogenation treatment, a dehalogenation treatment, and a pore adjustment treatment on a dry-distilled charcoal, or by successively conducting a crushing treatment, a molding treatment, and a carbonization treatment on a dry-distilled charcoal.

19 Claims, 22 Drawing Sheets

△ EXAMPLE 1
□ EXAMPLES 2, 3, 4
○ EXAMPLES 5, 6, 7
◇ EXAMPLES 8, 9
▼ COMPARATIVE EXAMPLES 1, 2, 3

△ EXAMPLE 1
□ EXAMPLES 2, 3, 4
○ EXAMPLES 5, 6, 7
◇ EXAMPLES 8, 9
▼ COMPARATIVE EXAMPLES 1, 2, 3

○ EXAMPLES 11, 12, 13
▼ COMPARATIVE EXAMPLES 5, 6, 7

EXAMPLES 11, 12, 13
 COMPARATIVE EXAMPLES 5, 6, 7

TEMPERATURE OF HEATING
IN NITROGEN GAS  °C

○ EXAMPLES 11, 12, 13
▼ COMPARATIVE EXAMPLES 5, 6, 7

△ EXAMPLES 14, 15, 16
○ EXAMPLES 19, 20, 21
◇ EXAMPLE 22
□ EXAMPLES 23, 24
▲ COMPARATIVE EXAMPLES 8, 9, 10
▼ COMPARATIVE EXAMPLES 11, 12, 13

EXAMPLES 14, 15, 16
 EXAMPLES 19, 20, 21
 EXAMPLE 22
 EXAMPLES 23, 24
 COMPARATIVE EXAMPLES 8, 9, 10
 COMPARATIVE EXAMPLES 11, 12, 13

CARBON FOR A LITHIUM SECONDARY BATTERY, LITHIUM SECONDARY BATTERY, AND MANUFACTURING METHODS THEREFOR

TECHNICAL FIELD

The present invention relates to a carbon for a lithium secondary batteries which is suitable as electrode material for rechargeable lithium secondary batteries; to a manufacturing method therefor, and to a lithium secondary battery.

BACKGROUND ART

As the starting material for a carbon for an electrode, carbonized plant and animal material such as lignite, brown coal, anthracite coal, coke, wood charcoal, coconut shell char; any kind of resin such as phenol resin, furan resin, vinylidene chloride copolymer, etc., which have been heated (dry-distilled) in an inert gas, and the like may be used.

Because carbonaceous materials are chemically inactive, they are used in a wide range of applications such as adsorption agents, catalysts, electrode materials, structural materials for use in machines, etc.; however, these applications are closely related to the structure of the carbon.

That carbon which is referred to as porous carbon has special effects due to the development of pores. For example, using the adsorption phenomena, there are mixture separation and refining actions. In addition, the carbon used in electrical double layer capacitors, the carbon used in lithium secondary batteries, and the like display electrochemical storage effects.

The structure of the carbonaceous material can take various forms depending on the starting material and the manufacturing method. Char and activated carbon obtained by activating char comprise microcrystalline carbon (crystallite), and carbon which takes on a chain structure. When the carbonaceous material is a nongraphitizing carbon, the crystallites take on a structure which is layered in a disorderly manner, and a wide range of pores, from micropores to macropores, are formed in the gaps between these crystallites.

The crystallites are layers of net planes of six membered carbon rings of several parallel layers, and graphite carbon which has a six membered carbon ring structure bonds using hybridized orbitals $SP^2$. A net plane comprising six membered ring carbon is called a basal plane.

A graphitizing carbon develops crystallites by means of heating at a high temperature, and finally becomes graphite.

A nongraphitizing carbon and a graphitizing carbon which has not been completely graphitized usually contain unorganized carbon. Unorganized carbon refers to carbon other than graphite carbon which is chemically bonded to graphite carbon only; carbon which has a chain structure; carbon which is stuck around six membered ring carbon; carbon which is in the periphery (the prism plane) of six membered ring carbon; carbon which is held in cross-linked structures with other six membered carbon rings (crystallites), and the like. Unorganized carbon is bonded with oxygen atoms, hydrogen atoms, and the like in forms such as C—H, C—OH, C—OOH, and C=O; or is in the form of double bonded carbon (—C=C—).

Lithium secondary batteries which use porous carbonaceous material in the negative electrode are charged by means of the uptake (doping) of lithium ions by the carbonaceous material of the negative electrode and are discharged by the release (un-doping) of lithium ions. In this lithium secondary battery, the charging capacity is determined by the amount of lithium ions with which the carbonaceous material is doped and the discharging capacity is determined by the un-doping amount. The efficiency of the electrical charging and discharging is defined as the ratio of the charging capacity to the discharging capacity.

When using graphite as the above-mentioned carbonaceous material, the lithium ions are taken in between the layers of the net planes of the carbon. In this case, the opinion is that the theoretical maximum for the doping quantity is when there is one lithium ion for every six carbon atoms. However, there are reports that, when non-graphitizing carbonaceous material is used, charging capacities which exceed the above-mentioned theoretical maximum amount can be obtained.

To the present, various proposals have been made for manufacturing methods for electrode carbon for lithium secondary batteries. For example, those recited in Japanese Patent Application, First Publication, No. Hei 2-66856; Japanese Patent Application, First Publication, No. Hei 6-187972; Japanese Patent Application, First Publication, No. Sho 61-218060; Japanese Patent Application, First Publication, No. Hei 5-335017; Japanese Patent Application, First Publication, No. Hei 2-230660; Japanese Patent Application, First Publication, No. Hei 5-89879; Japanese Patent Application, First Publication, No. Hei 5-182668; Japanese Patent Application, First Publication, No. Hei 3-245473; and Japanese Patent Application, First Publication, No. Hei 5-144440.

Japanese Patent Application, First Publication, No. Hei 2-66856 discloses that a carbon in which the distance $d_{002}$ of the crystals is 3.80 Å and for which the density is 1.55 g/cm$^3$ can be obtained by carbonizing furfuryl alcohol resin at 500° C., and then heat-treating it at 1100° C., and that it is possible to dope the spaces between the carbon net planes with a large amount of lithium ions.

Japanese Patent Application, First Publication, No. Hei 6-187972 obtains a carbonaceous material by reacting a condensed polynuclear aromatic compound and a cross linking agent such as paraxyleneglycol, and baking the generated resin at a temperature of 1000° C. or greater. The aromatic component forms a crystallized graphite structure and the cross-linking agent forms a non-crystallized domain, and this is suitable as a carbonaceous material for a lithium secondary battery.

Japanese Patent Application, First Publication, No. Sho 61-218060 discloses that a substance obtained by heat-treating an aromatic condensed resin, such as polyacene, and which has a H/C atomic ratio of 0.5~0.05, a BET specific surface area of 600 m$^2$/g or greater, and communicating pores having an average pore size of 10 μm is suitable. It discloses that it is possible to manufacture a carbon having the above-mentioned characteristics by means of adjusting an aqueous solution of an initial polymer and an inorganic salt such as zinc chloride, and then heat-treating this at a temperature of 350~800° C. which causes a three dimensional network structure to develop.

(Problem to be Solved By the Present Invention)

Lithium secondary batteries are used as power sources for portable telephones, small size personal computers and the like, however, when used for these applications, the total discharge capacity, total discharge efficiency, effective discharge capacity, and effective discharge ratio (these are called discharging characteristics) are insufficient, and improvements in these are desired.

Lithium secondary batteries, in general, have the problems of irreversible charging and discharging due to which the whole of the charging capacity cannot be discharged, and that the total discharge capacity and effective discharge capacity are low.

In addition, in a secondary battery which is used at a certain fixed voltage, large effective discharge capacity which can maintain that voltage, and large effective discharge ratio are sought, and conventional lithium secondary batteries do not have satisfactory discharging characteristics.

The present invention learning from the above circumstances, aims to provide a carbon for a lithium secondary battery which can be used in the manufacture of lithium secondary batteries which have excellent discharging characteristics by using this carbon in the electrode material of chargeable lithium secondary batteries, a manufacturing method therefor, and a lithium secondary battery.

DISCLOSURE OF INVENTION

A first aspect of the present invention is a manufacturing method for a carbon for a lithium secondary battery comprising a halogenation step in which a halogenated dry-distilled charcoal is obtained by bringing a gas which contains halogen into contact with dry-distilled charcoal; a dehalogenation step in which a dehalogenation treated carbon is obtained by eliminating a part or all of the halogen in the above-mentioned halogenated dry-distilled charcoal; and a pore adjustment step in which this dehalogenation treated carbon is brought into contact with thermally decomposable hydrocarbon.

In this first aspect, the above-mentioned dry-distilled charcoal may be a dry-distilled phenol resin.

The above-mentioned halogen may be one selected from the group consisting of chlorine, bromine, and a combination of chlorine and bromine.

The above-mentioned halogenation step may be a heat treatment conducted at a temperature of 350~1000° C. in a gas containing halogen diluted with an inert gas.

The above-mentioned dehalogenation step may include at least one dehalogenation treatment selected from the group consisting of a) a dehalogenation treatment in which a halogenated dry-distilled charcoal is heated at a temperature of 700~1400° C. in an inert gas or under vacuum evacuation; b) a dehalogenation treatment in which heating is conducted at a temperature of 600~850° C. in lower hydrocarbon gas or in steam diluted with an inert gas; and c) a dehalogenation treatment in which heating is conducted at a temperature of 600~1400° C. in hydrogen gas diluted with an inert gas.

This dehalogenation step may be any one step selected from the group consisting of: a step in which the above-mentioned treatment a) is conducted; a step in which the above-mentioned treatment b) or the above-mentioned treatment c) is conducted; a step in which the above-mentioned treatment a) is conducted, and, thereafter, either one of the above-mentioned treatment b) or the above-mentioned treatment c) is conducted; and a step in which either one of the above-mentioned treatment b) or the above-mentioned treatment c) is conducted, and, thereafter, the above-mentioned treatment a) is conducted.

After the above-mentioned dehalogenation step, a crushing step in which the above-mentioned dehalogenation treated carbon is crushed may be included, and after the above-mentioned crushing step, the above-mentioned pore adjustment step may be conducted.

The above-mentioned pore adjustment step may be a heat treatment conducted at a temperature of 600~1100° C. in a thermally decomposable hydrocarbon diluted with an inert gas.

The above-mentioned thermally decomposable hydrocarbon may generate carbon when thermally decomposed and may be at least one hydrocarbon selected from the group consisting of aromatic hydrocarbons, cyclic hydrocarbons, saturated chain hydrocarbons, and unsaturated chain hydrocarbons.

From the completion of the above-mentioned dehalogenation step to the beginning of the above-mentioned pore adjustment step, it is preferable for the above-mentioned dehalogenation treated carbon to be handled in an inert gas.

A molding step in which one of either of the above-mentioned dry-distilled charcoal or the above-mentioned halogenated dry-distilled charcoal and an organic binding agent added thereto are molded may be included.

When the above-mentioned molding step is a step in which a molding treatment is conducted in which the above-mentioned dry-distilled charcoal and an organic binding agent added thereto are molded, a second dry-distillation step may be conducted in which this organic binding agent is carbonized by heating the dry-distilled charcoal in an inert gas after the molding step, and after this second dry-distillation step, the above-mentioned halogenation step may be conducted.

When the above-mentioned molding step is a step in which a molding treatment is conducted in which the above-mentioned halogenated dry-distilled charcoal and an organic binding agent added thereto are molded, the above-mentioned dehalogenation step may be conducted after this molding step. In this case, the dehalogenation step may be a heat treatment in which the rate of temperature increase is 20~500° C./h.

A carbonization step in which the above-mentioned organic binding agent in the halogenated dry-distilled charcoal after the above-mentioned molding step is carbonized can also be conducted. This carbonization step can be a heat treatment in which heating is conducted in an inert gas at a temperature of 450~1300° C. with a rate of temperature increase of 20~500° C./h.

By means of the manufacturing method of the above-mentioned first aspect, a carbon for a lithium secondary battery can be obtained.

This carbon for a lithium secondary battery can have a density of 0.7~1.2 g/cm$^3$.

In a manufacturing method for a lithium secondary battery comprising a carbon electrode, a lithium electrode, and an electrolytic solution provided between these electrodes, a lithium secondary battery can be manufactured by means of conducting an assembly step in which a lithium secondary battery is assembled in a dried inert gas using a carbon for a lithium secondary battery obtained by means of the manufacturing method of the above-mentioned first aspect as the carbon electrode.

In addition, in a lithium secondary battery comprising a carbon electrode, a lithium electrode, and an electrolytic solution provided between these electrodes, a carbon for a lithium secondary battery obtained by means of the manufacturing method of the above-mentioned first aspect may be used as the carbon electrode.

A second aspect of the present invention is a manufacturing method for a carbon for a lithium secondary battery comprising a crushing step in which a dry-distilled charcoal is crushed; a molding step in which a molded article is obtained by conducting a molding treatment on this crushed dry-distilled charcoal and an organic binding agent added thereto; and a carbonization step in which the above-mentioned organic binding agent in the above-mentioned molded article is carbonized.

The above-mentioned dry-distilled charcoal may be a phenol resin which has been dry-distilled.

The above-mentioned carbonization step may be a heat treatment in an inert gas in which the temperature is raised at a rate of 20~500° C./h, and heating is conducted at a temperature of 700~1400° C.

After the above-mentioned carbonization step, a pore adjustment step can be conducted in which the molded article is brought into contact with a thermally decomposable hydrocarbon.

The above-mentioned pore adjustment step may be a heat treatment conducted at a temperature of 600~1100° C. in a thermally decomposable hydrocarbon diluted with an inert gas.

The above-mentioned thermally decomposable hydrocarbon may generate carbon when thermally decomposed and may be at least one hydrocarbon selected from the group consisting of aromatic hydrocarbons, cyclic hydrocarbons, saturated chain hydrocarbons, and unsaturated chain hydrocarbons.

From the completion of the above-mentioned carbonization step to the beginning of the above-mentioned pore adjustment step, it is preferable for the above-mentioned carbonization treated molded article to be handled in an inert gas.

By means of the manufacturing method of the above-mentioned second aspect, a carbon for a lithium secondary battery can be obtained.

This carbon for a lithium secondary battery can have a density of 0.7~1.2 g/cm$^3$.

In addition, this carbon for a lithium secondary battery can have a pore volume of 0.15~0.4 cm$^3$/g.

In a manufacturing method for a lithium secondary battery comprising a carbon electrode, a lithium electrode, and an electrolytic solution provided between these electrodes, a lithium secondary battery can be manufactured by means of conducting an assembly step in which a lithium secondary battery is assembled in a dried inert gas using a carbon for a lithium secondary battery obtained by means of the manufacturing method of the above-mentioned second aspect as the carbon electrode.

In addition, in a lithium secondary battery comprising a carbon electrode, a lithium electrode, and an electrolytic solution provided between these electrodes, a carbon for a lithium secondary battery obtained by means of the manufacturing method of the above-mentioned second aspect may be used as the carbon electrode.

BEST MODE FOR CARRYING OUT THE INVENTION

Suitable modes of the invention are set out below.

First Mode

A process diagram for a manufacturing method for a carbon for a lithium secondary battery according to a first mode of the present invention is shown in FIG. 1.

Figure 1A:
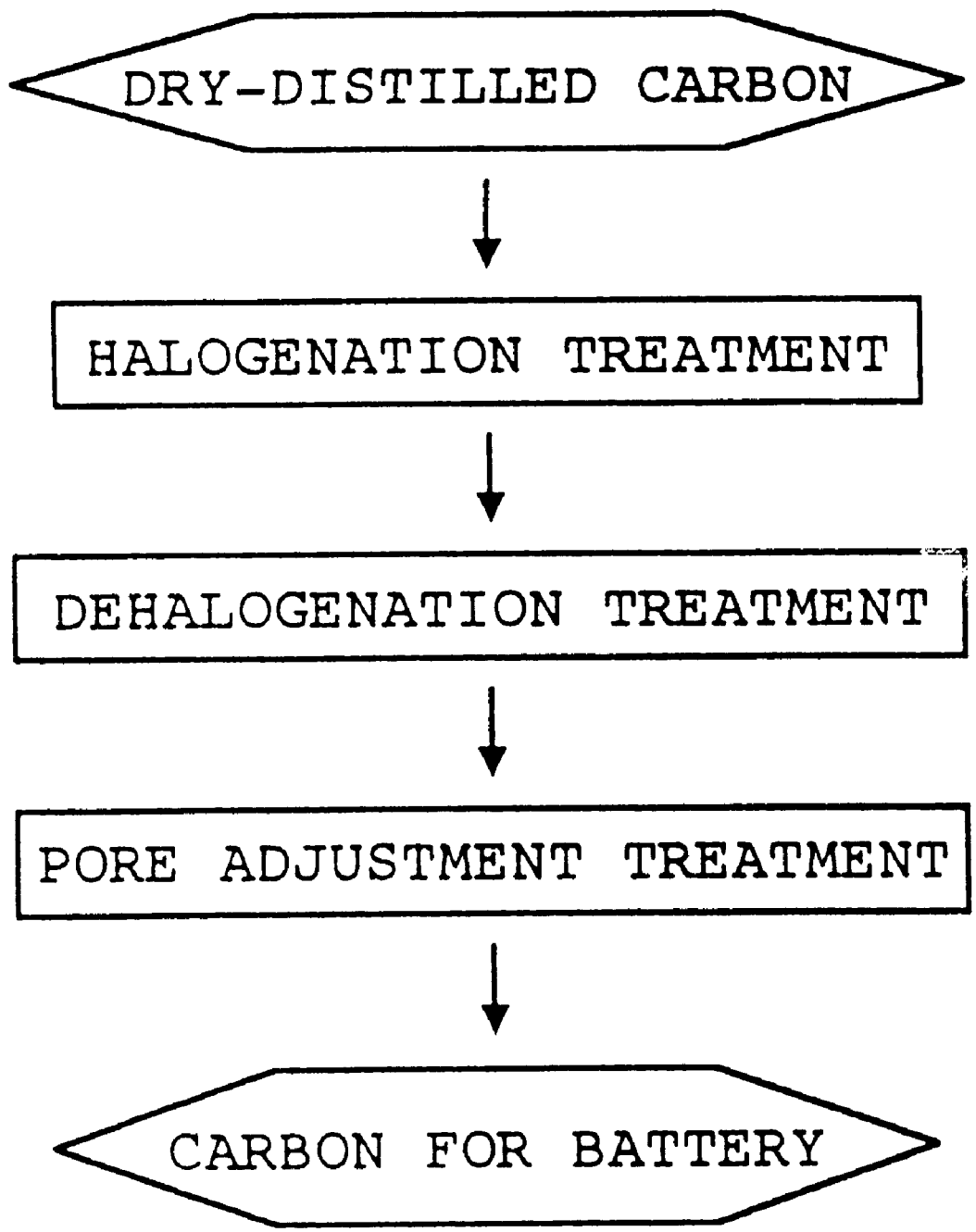
FIG. 1A is a process diagram showing one manufacturing method according to a first mode of the present invention.

According to the manufacturing method for a carbon for a lithium secondary battery shown in FIG. 1A, carbon for a lithium secondary battery is manufactured by successively conducting a halogenation step in which a halogenation treatment is conducted to obtain a halogenated dry-distilled charcoal by bringing a dry-distilled charcoal into contact with a halogen gas; a dehalogenation step in which a dehalogenation treatment is conducted to obtain a dehalogenation treated carbon by eliminating a part or all of the halogen in the above-mentioned halogenated dry-distilled charcoal; and a pore adjustment step in which a pore adjustment treatment is conducted in which this halogenation treated carbon is brought into contact with a thermally decomposable hydrocarbon.

Figure 1B:
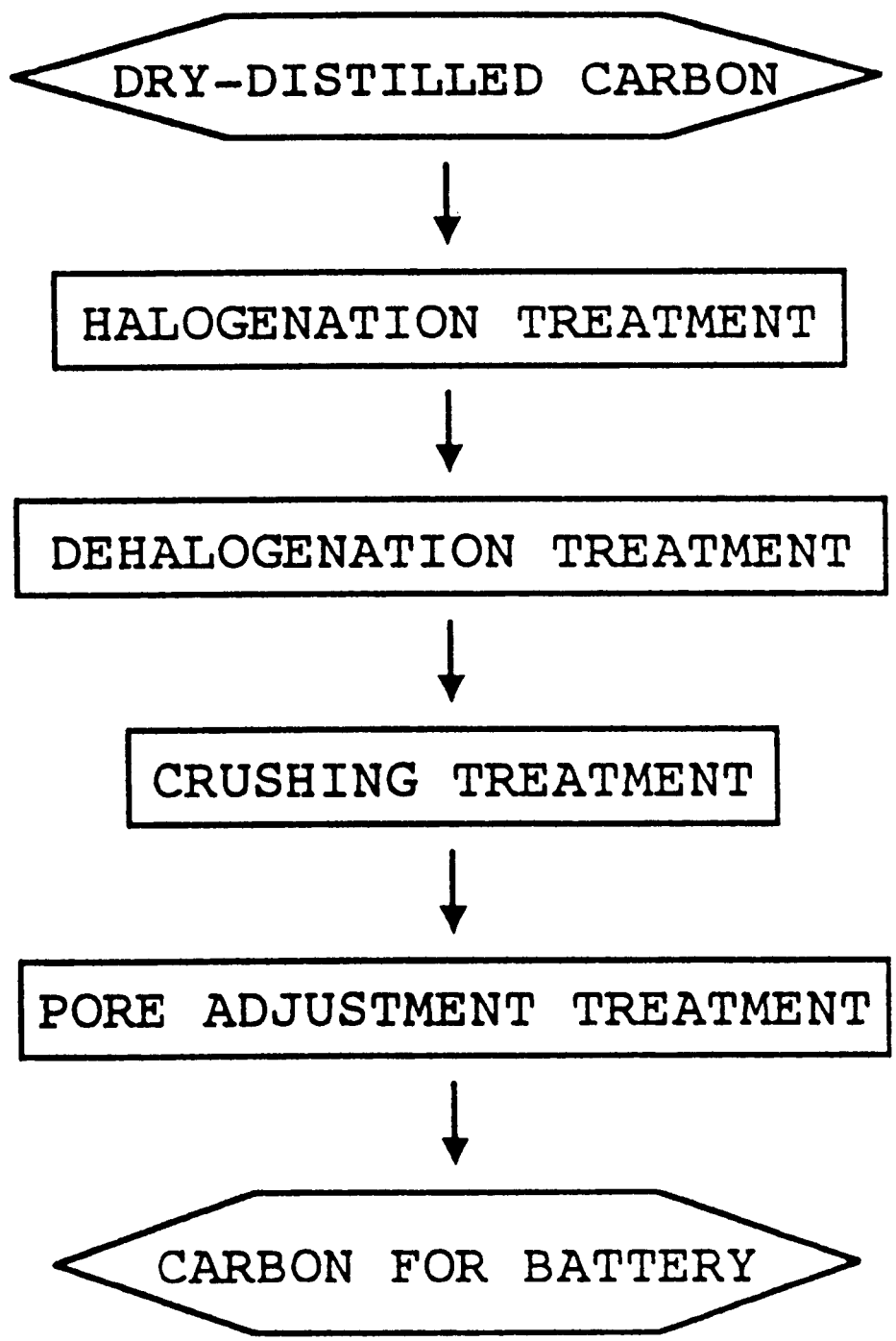
FIG. 1B is a process diagram showing another manufacturing method according to a first mode of the present invention.

In addition, according to the manufacturing method for a carbon for a lithium secondary battery shown in FIG. 1B, after the above-mentioned dehalogenation step in the manufacturing method shown in the above-mentioned FIG. 1A, a crushing step is conducted in which a crushing treatment for crushing the above-mentioned dehalogenation treated carbon is conducted, and by means of conducting the above-mentioned pore adjustment treatment on the dehalogenation treated carbon crushed in this way, a carbon for a secondary lithium battery is manufactured.

In this first mode, it is preferable for the above-mentioned dehalogenation treatment to be a treatment of at least one of a high temperature dehalogenation treatment and a low temperature dehalogenation treatment. A treatment in which a halogenation treatment and a dehalogenation treatment are conducted is called a halogen treatment.

As the dry-distilled charcoal used in the manufacturing method for a carbon for a lithium secondary battery of the present invention, a substance obtained by the dry-distillation of any kind of starting material such as carbonized plant and animal material such as lignite, brown coal, anthracite coal, coke, wood charcoal, coconut shell char; any kind of resin such as phenol resin, furan resin, vinylidene chloride copolymer, etc., can be used, and from among these, phenol resin is preferably used.

Starting materials such as phenol resin are made into dry-distilled charcoal by suitably heating (dry distillation) them at a temperature of 550~1100° C. in an inert gas such as nitrogen gas or argon.

In this dry distillation, in order to manufacture uniform dry-distilled charcoal, it is preferable to make the starting material into granules or cylinders of several millimeters, and then dry-distill them in an inert gas. In addition, powdered starting material and an organic binder added thereto may be molded, and then dry-distilled.

In the manufacturing method for carbon for a lithium secondary battery according to this first mode, firstly, a porous carbonaceous material is manufactured by conducting a halogenation treatment on a dry-distilled charcoal. In this halogenation treatment, it is possible to use any halogen, however, chlorine gas and bromine gas are preferably used.

Using chlorinated dry-distilled charcoal as an example, the degree of chlorination of the halogenated dry-distilled charcoal is expressed by the atomic ratio of chlorine and carbon (Cl/C). This atomic ratio in the chlorination step is a molar ratio of the numbers of atoms which are obtained by the conversion from the weight of carbon and the weight of chlorine, in which the weight of the carbonized charcoal before the chlorination step is assumed to be the weight of carbon and the weight increase due to the chlorination step is assumed to be the weight of chlorine. In addition, in the dechlorination step, the degree of dechlorination is calculated from the value which is obtained by taking the weight decrease due to the dechlorination step to be the reduction in the quantity of chlorine, converting this into the number of atoms, and subtracting it from the number of chlorine atoms in the chlorinated carbon.

In real halogen treatments, due to the destructive distillation action accompanying the progress of carbonization, the activated action by steam (the gasification of carbon) and the like, the ratio of the number of atoms according to the above definition can also be a negative value.

The halogenation treatment is, when using chlorine gas for example, carried out by means of conducting a treatment in which dry-distilled charcoal is heated at a temperature of 350~1000° C., preferably 400~800° C., and more preferably at 500~700° C. in chlorine gas which has been diluted with an inert gas such as nitrogen. In addition, when using bromine in place of chlorine, a treatment is conducted in which dry-distilled charcoal is heated at a temperature of 350~1000° C., and preferably 400~800° C. in bromine gas which has been diluted with an inert gas such as nitrogen.

In the halogenation treatment, when the temperature of the heat treatment of the chlorination treatment (for example) exceeds 1000° C., due to the reduction in the quantity of hydrogen atoms as the carbonization progresses, the degree of chlorination is reduced, and therefore this is not desirable. In addition, when the temperature of the heat treatment of the chlorination treatment is less than 350° C., because the reaction rate of the unorganized carbon and the chlorine is too slow, a long period of time is required for the chlorination treatment, and therefore this is not desirable. This is the same for bromination treatments.

With regard to the supply rate for the chlorine gas, when the concentration of the chlorine gas is 10% by volume, the superficial velocity in the column is of the level of 0.05~0.3 NL/(min.cm$^2$)(NL expresses the volume of the gas under standard conditions; this is the same hereinafter). The time for the chlorination treatment is about 30~120 minutes when in the high temperature region of the above-mentioned temperature range; however, about 120~240 minutes are required when in the low temperature range close to 400° C. In addition, with regard to the supply rate for bromine gas, when the concentration of the bromine gas is 10% by volume, the superficial velocity in the column is of the level of 0.05~0.3 NL/(min.cm$^2$). The time for the bromination treatment is about 30~120 minutes when in the high temperature region; however, about 120~240 minutes are required when in the lower temperature region.

In the halogenation treatment, in the main, since hydrogen atoms in the dry-distilled charcoal are replaced by halogen atoms, such as chlorine atoms, halogenated hydrogen, such as hydrogen chloride (HCl) and hydrogen bromide (HBr), is detected in the exhaust gas.

Here, the inert gases are nitrogen, rare gases such as helium and argon, or mixes of these gases.

By means of the above-mentioned halogenation treatment, halogenated dry-distilled charcoals such as a chlorinated dry-distilled charcoal having an atomic ratio of chlorine to carbon (Cl/C) of 0.03 or greater, and preferably of 0.07 or greater, and a brominated dry-distilled charcoal having an atomic ratio of bromine to carbon (Br/C) of 0.01 or greater, and preferably 0.03 or greater can be obtained. Moreover, it is not desirable for this atomic ratio to be less than the above-mentioned minimum values, since the formation of micropores is insufficient, and when the manufactured carbonaceous material is used in lithium secondary battery, good charging and discharging properties cannot be obtained. In addition, the upper limit of the above-mentioned atomic ratio is determined by the carbonization temperature and the quantity of hydrogen atoms in the halogenated dry-distilled charcoal, and is not particularly limited; however, it is understood that when the atomic ratio (Cl/C) is 0.315 or less, and when the carbonaceous material is used in a lithium secondary battery, improvements in the charging and discharging properties can be obtained.

The low temperature dehalogenation treatment is a treatment in which the above-mentioned halogenated dry-distilled charcoal is heated in a lower hydrocarbon gas or in steam which has been diluted with an inert gas, and the halogen eliminated; and it is a treatment in which heating is conducted at a temperature of 600~850° C., and preferably 650~750° C. In addition, the low temperature dehalogenation treatment is a treatment in which the halogen is eliminated by heating the halogenated dry-distilled charcoal in hydrogen gas diluted with an inert gas, and the heating is conducted at a temperature of 600~1400° C., and preferably at 650~1200° C.

When the temperature is less than 600° C., the rate of the dehalogenation is slow, and therefore this is not desirable. When the above-mentioned hydrogen compound is steam, and when the heat treatment exceeds a temperature of 850° C., since activation effects due to the steam progress too far, the formation of micropores is obstructed, the carbon yield is reduced, and the effects of the present invention are reduced. When the hydrogen compound is hydrogen, since there are no activation effects, the upper limit of the temperature for the heat treatment of the low temperature dehalogenation can be 1400° C. When the upper temperature exceeds 1400° C., the pore structure formation is obstructed and the effects of the present invention are reduced.

The time for the heat treatment is approximately 20~60 minutes.

With regard to the degree of dehalogenation, when the halogen is chlorine, the above-mentioned atomic ratio (Cl/C) is preferably 0.02 or less, and when the halogen is bromine, the above-mentioned atomic ratio (Br/C) is preferably 0.01 or less, however, this is not a limitation, and the effects of the present invention can be obtained if a part of the halogen remains.

In the dehalogenation treatment, the halogen in the dry-distilled charcoal is mainly eliminated as halogenated hydrogen such as hydrogen chloride and hydrogen bromide, and as a result hydrogen chloride and hydrogen bromide can be detected in the exhaust gas.

Here, the hydrogen compound gas is steam ($H_2O$); hydrogen; lower hydrocarbons, such as methane ($CH_4$), ethane ($C_2H_6$), ethylene ($C_2H_4$), propane ($C_3H_8$), propylene ($C_3H_6$), butane ($C_4H_{10}$), and butylene ($C_4H_8$); and mixtures of these gases. As a hydrogen compound gas in an inert gas, the exhaust gas of LPG (liquid petroleum gas) which has been incompletely burned is suitable for industrial use. The composition of the above-mentioned exhaust gas is, for example, steam: 13~17% by volume; carbon dioxide: 9~12% by volume; carbon monoxide: 0.01~1% by volume; nitrogen: 68~74% by volume; and unburned lower hydrocarbons: 0.01~3% by volume.

When the above-mentioned hydrogen compound is steam, the concentration of the steam is not particularly limited; however, when the superficial velocity in the column is from 0.05 to 0.15 NL/(min.cm$^2$), 3% by volume is sufficient.

When the above-mentioned hydrogen compound is a lower hydrocarbon such as methane, the concentration of the lower hydrocarbon is not particularly limited; however, when the superficial velocity in the column is from 0.05 to 0.15 NL/(min.cm$^2$), 40% by volume is sufficient.

The high temperature dehalogenation treatment is a heat treatment conducted in an inert gas at a temperature of 700~1400° C., and preferably 800~1300° C. In addition, when the high temperature dehalogenation treatment is conducted under vacuum evacuation, the heat treatment is conducted at a temperature of 700~1400° C., and preferably 800~1300° C. The degree of vacuum evacuation is not particularly limited, however, 10 Torr is suitable. A time of approximately 30~120 minutes is necessary for the heat treatment. When the temperature of the high temperature dehalogenation is a temperature of less than 700° C., a long period of time is necessary to eliminate the halogen, and therefore efficiency is poor, and when the temperature exceeds 1400° C., the effects of heat shrinkage are too great and this is not desirable for pore structure formation.

The high temperature dehalogenation treatment has the action of eliminating halogen as well as the action of reducing porosity by heat shrinking the entire porous carbonaceous material.

In this first mode, the preferable dehalogenation step is any one of a step in which a low temperature dehalogenation treatment or a high temperature dehalogenation treatment is independently conducted; a step in which a low temperature dehalogenation treatment and then a high temperature dehalogenation treatment are conducted; and a step in which a high temperature dehalogenation treatment and then a low temperature dehalogenation treatment are conducted. The atomic ratio for the halogen which remains after this dehalogenation treatment with regard to the carbon is preferably, for a chlorine treatment, a Cl/C of 0.02 or less, and, for a bromination treatment, a Br/C of 0.01 or less, however, these are not limitations, and the effects of the present invention can be obtained even if some part of the halogen remains.

The porous carbonaceous material obtained by means of the above-mentioned halogen treatment adsorbs oxygen and nitrogen in an amount of 12.5~20 cc/g, and this is an increase in adsorption of 15~50% compared with that of convention carbonaceous material.

A pore adjustment treatment in which a thermally decomposable hydrocarbon is brought into contact with dehalogenation treated carbonaceous material is conducted. The carbon before it is given the pore adjustment treatment is called electrode carbon precursor.

In one embodiment of the pore adjustment in which contact is made with thermally decomposable carbon, a heat treatment may be conducted on a electrode carbon precursor at a temperature of 600~1100° C., preferably 700~1050° C., and more preferably 800~1000° C., in a thermally decomposable hydrocarbon diluted with an inert gas. The pore adjustment treatment is conducted in order to adjust the size of the pores so that the organic solvent in the electrolytic solution does not enter the pores, and pores of the desired size can be obtained by appropriately selecting the type of thermally decomposable hydrocarbon, the treatment temperature, and the treatment time. When the heating temperature exceeds 1100° C., it becomes difficult to control the impregnation of the thermally decomposed carbon, and the formation of the desired pores in the carbon becomes difficult. When the temperature is less than 600° C., the rate of thermal decomposition of the hydrocarbon becomes slow and a long period of time is necessary for the pore adjustment, and therefore this is undesirable.

With regard to the above-mentioned thermally decomposable hydrocarbon, at least one hydrocarbon which generates carbon when decomposed, selected from the group consisting of aromatic hydrocarbons, cyclic hydrocarbons, saturated chain hydrocarbons, and unsaturated chain hydrocarbons can be used. As this thermally decomposable hydrocarbon, for example, benzene, toluene, xylene, ethylbenzene, naphthalene, methylnapthalene, biphenyl, cyclohexane, methylcyclohexane, 1,1-dimethylcyclohexane, 1,3,5-trimethylcyclohexane, cycloheptane, methane, isobutane, hexane, heptane, isooctane, acetylene, ethylene, butadiene, ethanol, isopropanol, isobutylene, and the like can be used, and preferably benzene and toluene are used.

Another embodiment of the pore adjustment treatment in which contact is made with a thermally decomposable hydrocarbon is conducted on a electrode carbon precursor by means of thermal decomposition of a liquid hydrocarbon compound with which the electrode carbon precursor is impregnated. One practical example is, for example, impregnating the above-mentioned precursor from 1 to 20% by volume with 2,4-xylenol, quinoline, or creosote; then, under a nitrogen gas current, these hydrocarbon compounds are decomposed by heating at a temperature at which these hydrocarbon compounds will decompose, for example 600–1200° C.; the carbon is deposited, and the deposited carbon makes the pores of the precursor narrower. In addition, as the thermally decomposable hydrocarbon, pitch, resin, and the like can be used.

The pore adjustments by contact with thermally decomposable hydrocarbon of both of the above-mentioned embodiments can also be used in the second and third modes.

In this first mode, after conducting the pore adjustment, a crushing treatment is conducted, and from this crushed product, electrodes can be manufactured. However, when the average particle size of the particles after crushing is extremely small, the pore adjustment effects may be reduced, and, therefore, in another method of the first mode, after a dehalogenation treatment, a crushing treatment is conducted, and then the above-mentioned pore adjustment treatment can be conducted, and this is a more preferable method.

In the above-mentioned crushing treatment, the precursor is crushed to an average particle size of several $\mu$m to tens of $\mu$m using normal methods such as a vibrating ball mill.

After the above-mentioned dehalogenation treatment is completed or after the above-mentioned crushing treatment, and until the above-mentioned pore treatment begins, it is preferable for the carbon precursor to be preserved and treated in an inert gas. It is desirable for the step of manufacturing the carbon electrode from the pore-adjusted carbon, and the steps of assembling the evaluation cell and the battery to be conducted in a dried inert gas. By doing this, reactions and adsorption of oxygen and steam can be prevented, and the battery efficiency is improved. Carbon given a pore adjustment treatment, and carbon which has been molded into a fixed shape for the purpose of measuring its charging and discharging characteristics are called "battery carbon" or abbreviated to "carbon", and that which has been impregnated with electrolytic solution is called "carbon electrode" (this is the same hereinafter).

The carbon for a lithium secondary battery obtained by means of the above-mentioned manufacturing method is superior in total discharge capacity, total discharge efficiency, effective discharge capacity, and effective discharge ratio.

Figure 2:
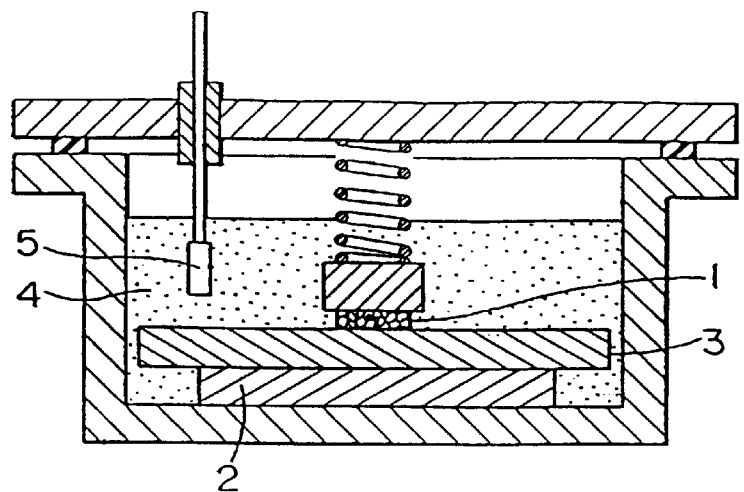
FIG. 2 is a cross-section of an evaluation cell used in the Examples and the Comparative Examples.

An evaluation cell for measuring charging and discharging capacity and efficiency is shown in FIG. 2. This cell comprises carbon electrode 1; lithium electrode 2 used as the opposite electrode; separator 3 provided between the carbon electrode 1 and the lithium electrode 2; electrolytic solution 4 which is in contact with these electrodes; and reference electrode 5 comprising lithium arranged in electrolytic solution. In addition, in the evaluation cell shown in FIG. 2, strictly speaking, carbon electrode 1 is the positive electrode and doping of lithium ions into carbon electrode 1 is discharging, however, from the point of view of convenience and in line with actual batteries, this process will be called charging, and in reverse, the process in which lithium ions are taken out of carbon electrode 1 is called discharging.

Figure 3:
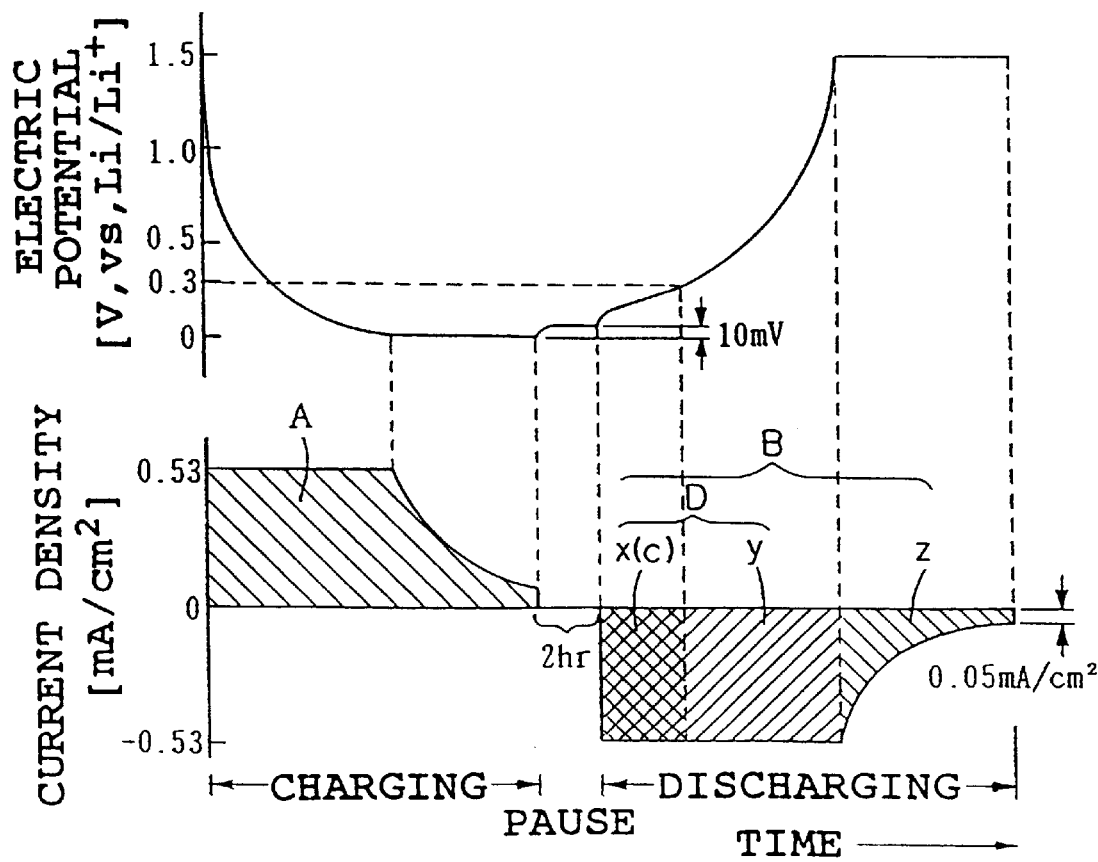
FIG. 3 is a diagram of typical current-potential curve when measuring charging capacity.

The test method for evaluating the charging and discharging capacity and efficiency is explained in accordance with the graph of current-potential curve shown in FIG. 3.

In the initial charging process, the initial electric potential of the carbon electrode of the negative electrode is approximately 1.5 V with respect to the lithium reference electrode 5, and the application of electric current is begun at a fixed electric current having a current density of 0.53 mA/cm$^2$. The potential of the carbon electrode 1 is gradually reduced, and when it reaches 0 mV, a switch over from the fixed electric current to the fixed electric potential is made; when the current density is sufficiently reduced, the power source is cut off; recharging is completed when the potential recovers to 10 mV or less after a two hour pause.

Next, after a 2 hour pause from the completion of the charging, the discharging process is conducted. Discharging is started at a fixed current of 0.53 mA/cm$^2$, and at the point of time that the potential reaches 1.5 V, a switch over is made to a fixed electric potential, and discharging is complete when the current density is 0.05 mA/cm$^2$ or less.

Total charge capacity A is represented by the area shown by the hatched portion A in FIG. 3. Total discharge capacity is represented by the area shown by the hatched portion (x+y+z) in FIG. 3. Charging capacity and discharging capacity are shown as capacity per 1 g of carbonaceous material. Total discharge efficiency K (B/A) is calculated from B÷A× 100 (%).

In the discharging process, discharging is started at a fixed current of 0.53 mA/cm$^2$, and the effective discharge capacity C is the capacity of the discharge which occurs up to the point at which the electric potential reaches EV (in the present invention it is 0.3V). Effective discharge capacity C is represented by the area shown by the cross-hatched portion x in FIG. 3.

In addition, the capacity of the discharge which occurs up to the point of at which the electric potential reaches 1.5V is fixed current discharge capacity D. Fixed current discharge capacity D is represented by the area shown by the hatched portion (x+y) of FIG. 3. Effective discharge ratio K (C/D) is calculated from C→D×100(%).

For a lithium secondary battery, the larger the discharge capacity up to reaching electric potential E, the better. At this time the largest discharge capacity is the discharge capacity D which can be maintained at a fixed current of 0.53 mA/cm$^2$. The extent to which the effective discharge ratio is high, the smaller the initial slope of the electric potential increase curve, and the slope at the time approaching the completion of discharge is steep. When the electric potential increase curve shows this type of condition, the discharge properties are said to be good.

As the electrolytic solution, any electrolyte dissolved in an organic solvent can be used, however, as an example, as electrolytes: $LiClO_4$, $LiAsF_6$, $LiPF_6$, $LiBF_4$, and the like can be used; and, as organic solvents: propylene carbonate, ethylene carbonate, diethyl carbonate, dimethyl carbonate, 1,2-dimethoxyethane, 1,2-diethoxyethane, γ-butyllactone, tetrahydrofuran, 2-methyltetrahydrofuran, diethyl ether, acetonitrile, and the like can be used. This is also the same in the second and third modes.

The basis for manufacturing a carbon for a lithium secondary battery having superior discharging properties by means of the above-mentioned manufacturing method is explained below.

In the halogenation treatment, the halogen, chlorine for example, which is brought into contact with the dry-distilled charcoal reacts with the unorganized carbon. In these reactions, there are addition reactions of chlorine to double bonded carbons, exchange reactions of chlorine atoms for hydrogen atoms which are bonded to the unorganized carbon (hydrogen chloride in a molar equivalent to chlorine is generated), dehydrogenation reactions (hydrogen chloride twice that of the chlorine is generated), and so on.

In the dehalogenation treatment, the halogen, chlorine for example, which is bonded to the above-mentioned unorganized carbon is eliminated. It is believed that new bonds between carbons (hereinafter, called carbon bonds) are formed by occurrence of a reaction, shown in the following formula, which occurs in the halogenation (chlorine) treatment, the low temperature dehalogenation (chlorine) treatment and the high temperature dehalogenation (chlorine) treatment. In the following formula (i), the mark | located to the side of a C indicates that it is an unorganized carbon.

$$C|\!-\!Cl + C|\!-\!H \rightarrow C\!-\!C + HCl \qquad (i)$$

By means of the formation of these new carbon bonds, actions such as the action of repairing defects in the polyaromatic ring structure of the crystallites or the carbon net planes, the action of growth of the crystallites, and the action of changes in the aggregation condition of crystallites are believed to take place, but these details are unclear. However, by means of these actions, it is believed that a large number of micropores (0.8~2 nm) and/or submicropores (<0.8 nm) are formed which are suitable for the adsorption of gases which have small molecular diameters such as oxygen and nitrogen. In addition, it is believed that these pores are effectively active in the uptake and discharge of lithium ions.

Another action of the high temperature dehalogenation treatment is the action of reducing the porosity by shrinking the entire porous carbon obtained by means of the halogen treatment. In other words, an action of tightening the aggregation of crystals is carried out. As a result, the pore size is also reduced.

A theory about the mechanism of pore adjustment has not been established but it is believed that the molecules of the solvent which have large molecular diameters cannot penetrate into the pores as a result of the narrowing of the openings of the micropores by thermally decomposed carbon. However, since the lithium ions which have small ionic diameters can pass, charging and discharging are possible. The penetration of the molecules of the solvent into the pores is believed to reduce the discharging capacity.

Carbon which has been dehalogenation treated, and carbon which has developed new cleavage planes due to crushing bond easily with oxygen and adsorb water. When heat-treated in order to conduct a pore adjustment, carbon which has bonded with oxygen, and carbon which has adsorbed water undergo carbon activation (gasification) easily. For this reason, pores formed by means of the halogen treatment and which are suitable for the uptake and release of lithium ions become disturbed. Consequently, it is believed that problems such as these can be avoided by preservation after the dehalogenation treatment, preservation during the crushing, and until the pore adjustment carried out after the crushing, in an inert gas such as nitrogen, argon, or the like.

It is believed that the carbon for a lithium secondary battery manufactured by means of the manufacturing method according to this first mode has improved discharging characteristics, such as total discharge capacity and total discharge efficiency, due to each of the above effects acting synergistically.

A lithium battery can be made using the carbon for a lithium secondary battery manufactured by means of the manufacturing method of this first mode as the negative electrode and using lithium or a lithium compound as the positive electrode. A negative electrode comprising the carbon of the present invention is called a carbon electrode, and a positive electrode comprising lithium or a lithium compound is called a lithium electrode. The combination of the carbon electrode of the present invention, the components of the positive electrode, the shape, the composition concentration of the electrolytic solution, and the like are all suitably set in accordance with the use of the lithium secondary battery.

Second Mode

FIG. 4 is a process diagram showing a second mode of the manufacturing method for a lithium secondary battery according to the present invention.

Figure 4A:
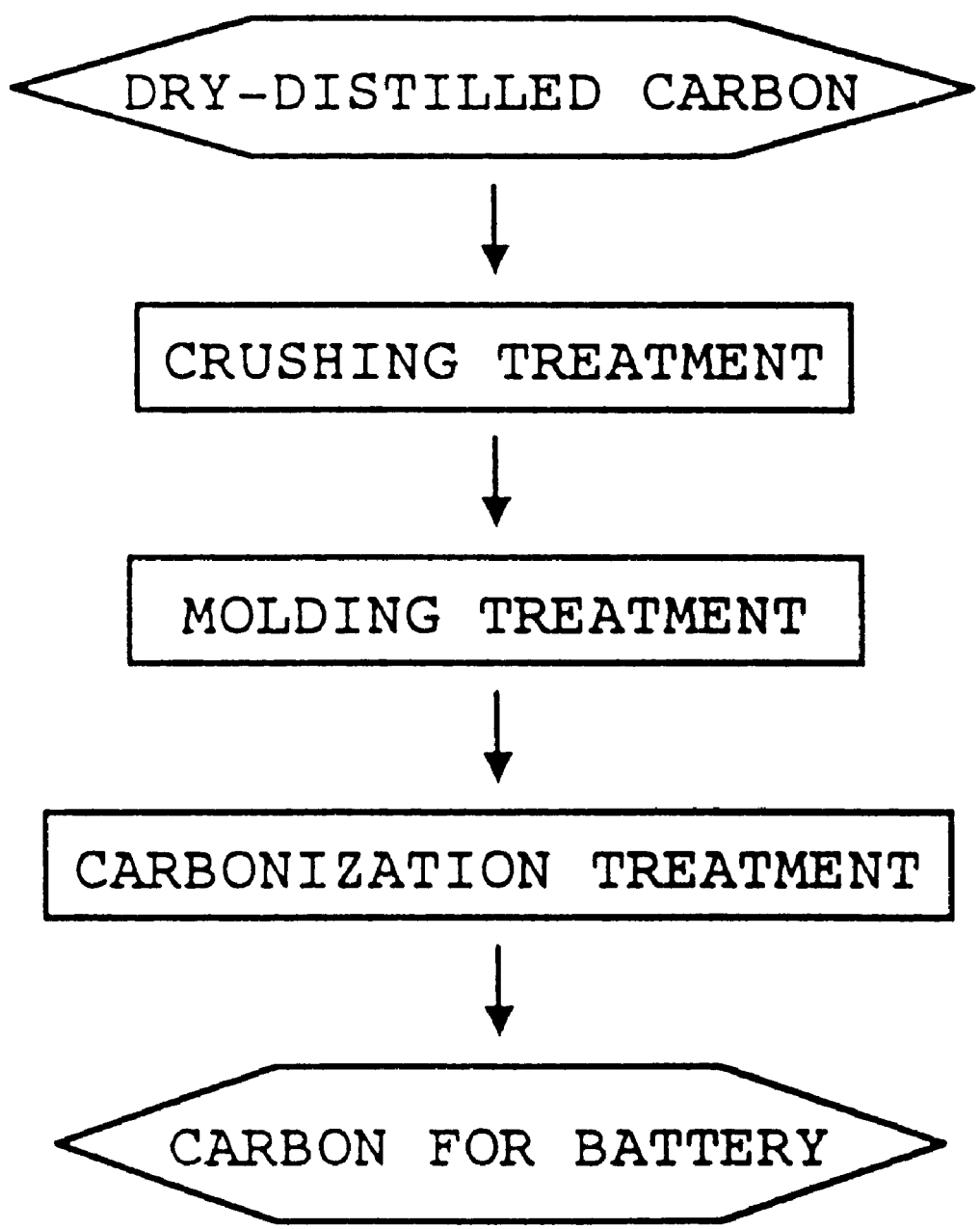
FIG. 4A is a process diagram showing one manufacturing method according to a second mode of the present invention.

According to the manufacturing method for a carbon for a lithium secondary battery shown in FIG. 4A, carbon for a lithium secondary battery is manufactured by successively conducting a crushing step in which a dry-distilled charcoal is given a crushing treatment, a molding step in which a molded article is obtained by conducting a molding treatment on this crushed dry-distilled charcoal and a binding agent added thereto; and a carbonization step in which a carbonization treatment for carbonizing this organic binder in this molded article is conducted.

Figure 4B:
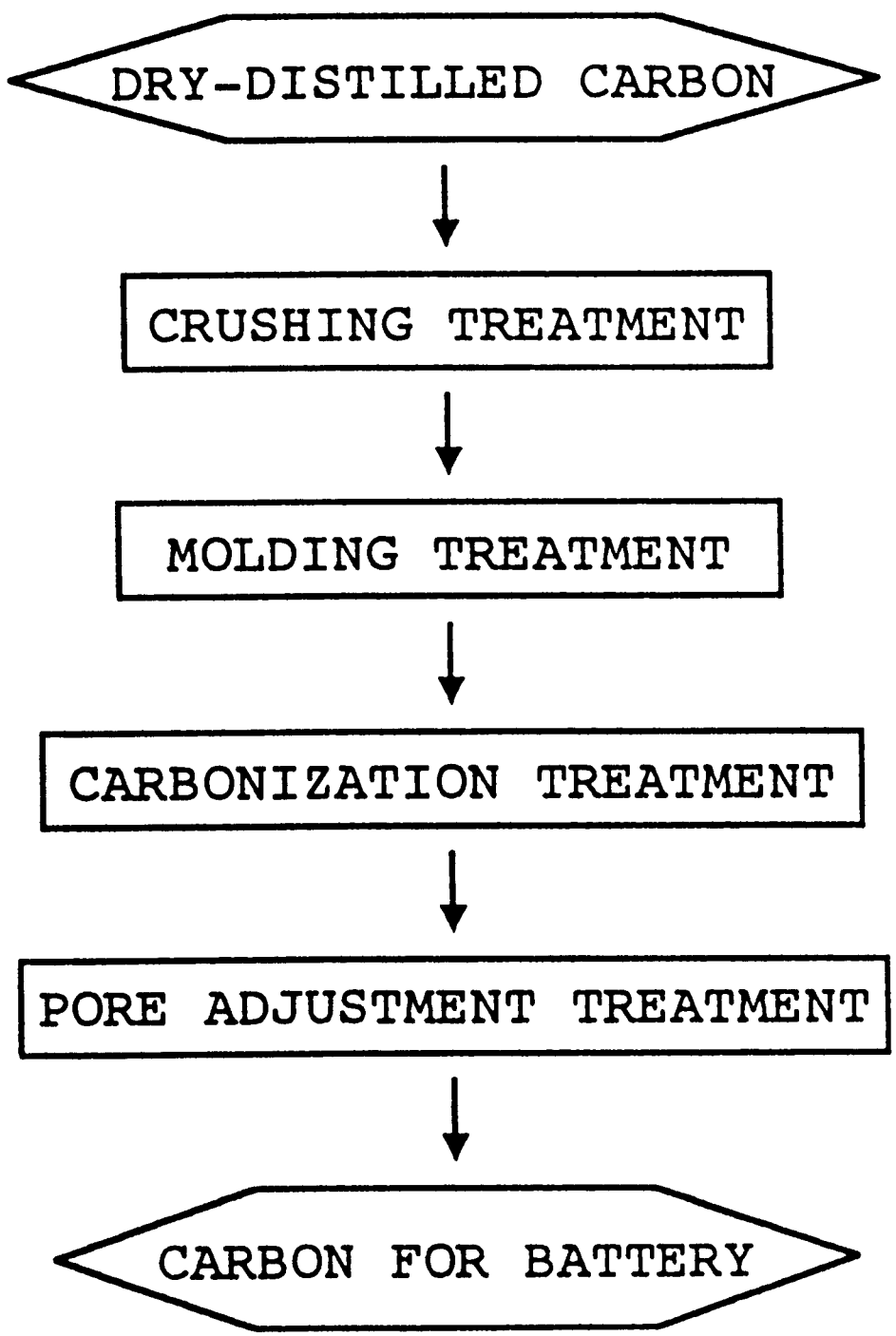
FIG. 4B is a process diagram showing another manufacturing method according to a second mode of the present invention.

In addition, according to the manufacturing method for a carbon for a lithium secondary battery shown in FIG. 4B, after the above-mentioned carbonization treatment step in the manufacturing method shown in the above-mentioned FIG. 4A, a carbon for a secondary lithium battery is manufactured by conducting a pore adjustment step in which a pore adjustment treatment is conducted by bringing the above-mentioned carbonization treated molded article into contact with a thermally decomposable hydrocarbon.

The starting materials used by the manufacturing method according to this second mode are the same as the starting materials in the above-mentioned first mode, that is, various starting materials such as carbonized plant and animal material such as lignite, brown coal, anthracite coal, coke, wood charcoal, coconut shell char; any kind of resin such as phenol resin, furan resin, vinylidene chloride copolymer, etc. can be used, and from among these, phenol resin is preferably used.

Starting materials such as phenol resin are made into dry-distilled charcoal by suitably heating (dry distillation) them at a temperature of 550~1100° C. in an inert gas such as nitrogen gas or argon.

In this dry distillation, in order to manufacture uniform dry-distilled charcoal, it is preferable to make the starting material into granules or cylinders of several millimeters, and then dry-distill it in an inert gas. In addition, powdered starting material and an organic binding agent added thereto may also be molded, and then dry-distilled.

When the manufactured dry-distilled charcoal is in a lumpy condition, the dry-distilled charcoal is crushed in order to obtain a suitable molded article. In this crushing treatment, the dry-distilled charcoal is crushed to an average particle size of several $\mu$m to tens of $\mu$m using normal crushing treatment methods such as a vibrating ball mill.

Molding (molding treatment) conducted by adding organic binding agent to the crushed dry-distilled charcoal.

This molding treatment is conducted by kneading crushed dry-distilled charcoal to which an organic binding agent has been added, inserting it into a metallic mold, and press molding it. The molding pressure is not particularly limited, and with a usual pressure of 500 kgf/cm², a suitable molded article can be obtained. Moreover, the molding method is not limited to press molding methods, molding methods which are generally conducted such as extrusion molding methods can be applied.

As the organic binding agent used in this molding treatment, those organic binding agents which are used in general molding treatments such as polyvinylidene fluoride, polyvinyl acetate, polyvinyl alcohol, polyvinyl pyrrolidone, acrylic resin, urea resin, melamine resin, phenol resin, epoxy resin, glycerin, dextrin, starch, syrup, pitch, coal tar, and the like may be used.

In addition to this, in order to adjust fluidity, it is preferable to add a solvent such as ethanol, cyclohexane, acetone, benzene, toluene, etc., and in order to improve mold separation properties, it is preferable to add a mold separation agent such as liquid paraffin.

When the amount of organic binding agent added to the dry-distilled charcoal is too great, efficiency as an electrode is reduced, and when it is too small, physical strength when made into a molded article is reduced, therefore, suitable combinations are added with consideration to efficiency as an electrode and to the physical strength of the molded body. When phenol resin is used as the organic binding agent, the total of the phenol resin, the solvent, and the liquid paraffin added is preferably 30~60 parts by weight with regard to 100 parts by weight of dry-distilled charcoal.

Next, the molded article obtained by the molding treatment is heated, and the organic binding agent within the molded article is carbonized (carbonization treatment).

It is preferable for this carbonization treatment to be conducted on the molded article in an inert gas, such as nitrogen gas or argon gas, at 700~1400° C., and preferably at 800~1300° C. When the temperature of this carbonization treatment is less than 700° C., the carbonization of the organic binding agent is insufficient, and when it exceeds 1400° C., the effects from heat shrinkage are too great, and therefore these situations are not desirable.

The time required for the carbonization treatment is approximately 30~120 minutes.

By means of this carbonization treatment, the organic binding agent within the molded article is carbonized by dry-distillation. The density of the carbonization treated molded article is 0.70~1.20 g/cm³, and the pore volume is 0.15~0.4 cm³/g.

In another method of the second mode, a pore adjustment is conducted on the carbonaceous material obtained by means of the carbonization treatment (pore adjustment treatment). This pore adjustment treatment is a treatment in which the carbonaceous material obtained by means of the carbonization treatment is heated in a thermally decomposable hydrocarbon diluted with an inert gas for 5~180 minutes at a temperature of 600~1100° C., preferably at 700~1050° C., and more preferably at 800~1000° C. When this heating temperature exceeds 1100° C., it becomes difficult to control the amount of impregnation of the thermally decomposed carbon, and when it is less than 600° C., the rate of the thermal decomposition of the thermally decomposable hydrocarbon is slow, and a long period of time is necessary for the pore adjustment, therefore, these situations are undesirable.

The thermally decomposable hydrocarbon used in this pore adjustment treatment can be the same as those used in the pore adjustment treatment of the above-mentioned first mode.

When conducting this pore adjustment treatment, it is preferable to handle the carbonaceous material (electrode carbon precursor) which has been carbonization treated and on which the pore adjustment treatment is being conducted in an inert gas such as nitrogen gas, argon gas, or the like. By means of handling the electrode carbon precursor in an inert gas in this way, since it is possible to prevent the electrode carbon precursor from reactions and adsorption of oxygen and water, the effects of pore adjustment are sufficiently obtained.

In addition, the manufacturing method for an lithium secondary battery is characterized by conducting the lithium secondary battery assembly process which uses the manufactured molded electrode carbon as negative electrode material in a dried inert gas. In other words, the processing of the carbonaceous material after the carbonization treatment, preservation after completion of the pore adjustment treatment, and assembly of the battery, such as during immersion in electrolytic solution, are preferably conducted in a dried inert gas.

In this manufacturing method for a carbon for a lithium secondary battery according to this second mode, a carbon powder obtained by conducting a crushing treatment on a dry-distilled charcoal and an organic binding agent added thereto, and then the organic binding agent is carbonized by means of heating in an inert gas, and thereby an electrode carbon for which the entire electrode has a unitary structure comprising carbon is obtained. Consequently, by being carbonized by means of the carbonization treatment, the organic binding agent added during the molding treatment is changed to carbon which can take up lithium ions and contribute to discharging, and, therefore, the charging and discharging capacity per unit of weight and per unit of volume of the electrode is increased. In addition, since the carbonized organic binding agent has conductive properties, it does not become a cause for increased resistance. In another method of the second mode, after the carbonization treatment, a pore adjustment treatment is conducted by contact with a thermally decomposable hydrocarbon diluted with an inert gas, and as a result, the inlets of the pores of the electrode carbon become narrower, and pores are formed into which it is possible for lithium ions which have a small ionic diameter to pass, but into which solvent molecules which have a large molecular diameter cannot penetrate, thereby making it possible to prevent reductions in the discharging capacity produced by adsorption of solvent molecules in the pores, and making it possible to improve the discharging characteristics of the lithium secondary battery.

When a carbon powder is given a pore adjustment and then molded into a sheet by the addition of a binding agent, there are occasions when some part of the carbon powders break; however, in the manufacturing method according to this example, since the pore adjustment is given to a molded carbon obtained by conducting a carbonization treatment on a molded article, the carbon electrode obtained by conducting a pore treatment on a molded article can be used in a lithium secondary battery as it is, and the best advantages of the above-mentioned pore adjustment can be obtained.

In this pore adjustment treatment, when a carbon to which oxygen and water have been adsorbed is heated for the purpose of giving it a pore adjustment, activation (gasification) of the carbon can occur easily, and therefore, the narrowing of the inlets of the pores during the pore adjustment may be incomplete. However, in the manufacturing method for lithium secondary battery according to this example, the adjustment of the diameter of the inlets of the pores by means of the pore adjustment can occur with certainty due to the fact that the handling of the molded carbon after conducting the carbonization treatment and before conducting the pore adjusting treatment is conducted in an inert gas such as nitrogen gas or argon gas.

In addition, when manufacturing a lithium secondary battery, it is possible to prevent the problem of reductions in the charging characteristics due to absorption of oxygen and water by the carbon for a battery and the electrolytic solution by means of conducting the assembly process for the lithium secondary battery which uses the carbon manufactured by means of the above-mentioned method in a dry inert gas.

When the carbon for a lithium secondary battery obtained by the above-mentioned manufacturing process is used as a negative electrode for a lithium secondary battery, the total discharge capacity and the total discharge efficiency are increased, and superior discharging characteristics are obtained.

Third Mode

FIG. 5 is a process diagram showing a third mode of the manufacturing method for a lithium secondary battery according to the present invention. In this third mode, a molding step is conducted in which a molding treatment is given by the addition of an organic binding agent to the above-mentioned dry-distilled charcoal or the above-mentioned halogenated dry-distilled charcoal of the manufacturing method of the first mode which is shown in FIG. 1A.

Figure 5A:
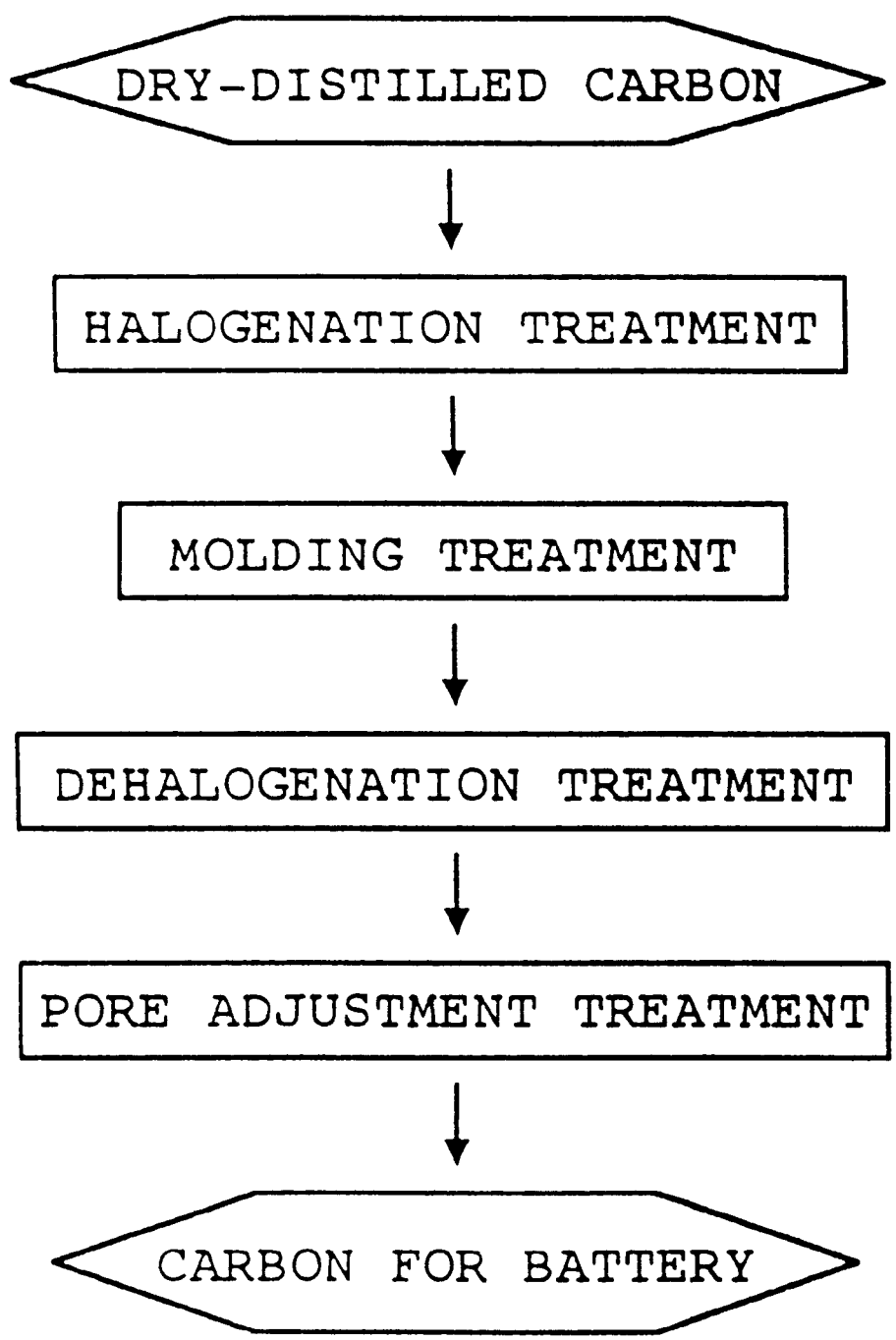
FIG. 5A is a process diagram showing one manufacturing method according to a third mode of the present invention.

According to the manufacturing method for a carbon for a lithium secondary battery shown in FIG. 5A, after the above-mentioned halogenation treatment in the manufacturing method of the first mode shown in FIG. 1A, by means of conducting a molding step in which a molding treatment is given to the above-mentioned halogenation treated carbon by the addition of an organic binding agent, and by conducting the above-mentioned dehalogenation step after said molding treatment, a carbon for a lithium secondary battery is manufactured.

Figure 5B:
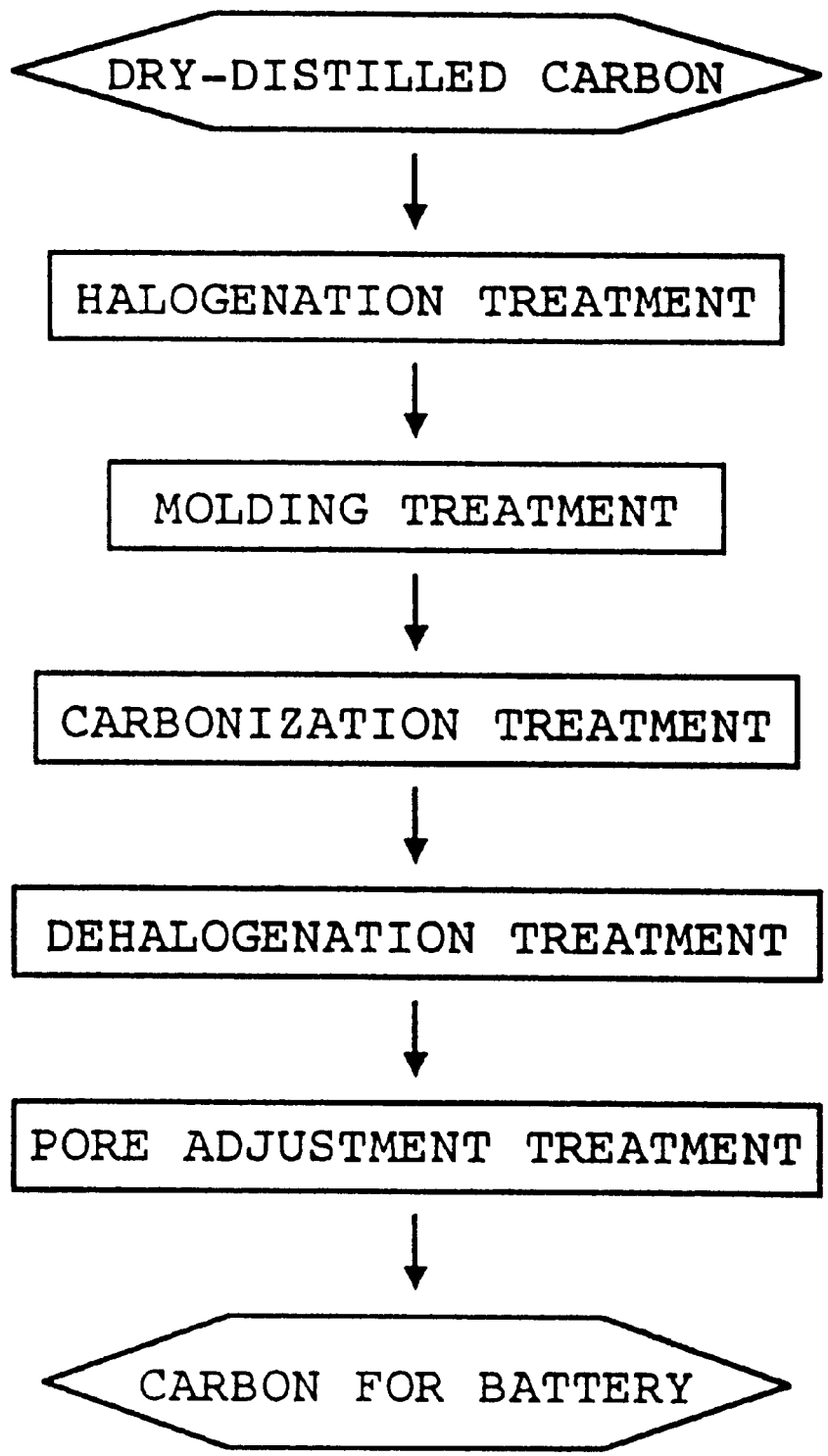
FIG. 5B is a process diagram showing another manufacturing method according to a third mode of the present invention.

According to the manufacturing method for a carbon for a lithium battery shown in FIG. 5B, after the above-mentioned molding step in the manufacturing method shown in FIG. 5A, by means of conducting a carbonization step by conducting a carbonization treatment in which the above-mentioned organic binding agent in the molding treated halogenated dry-distilled charcoal is carbonized, and by conducting the above-mentioned dehalogenation treatment after this carbonization step, a carbon for a lithium secondary battery is manufactured.

Figure 5C:
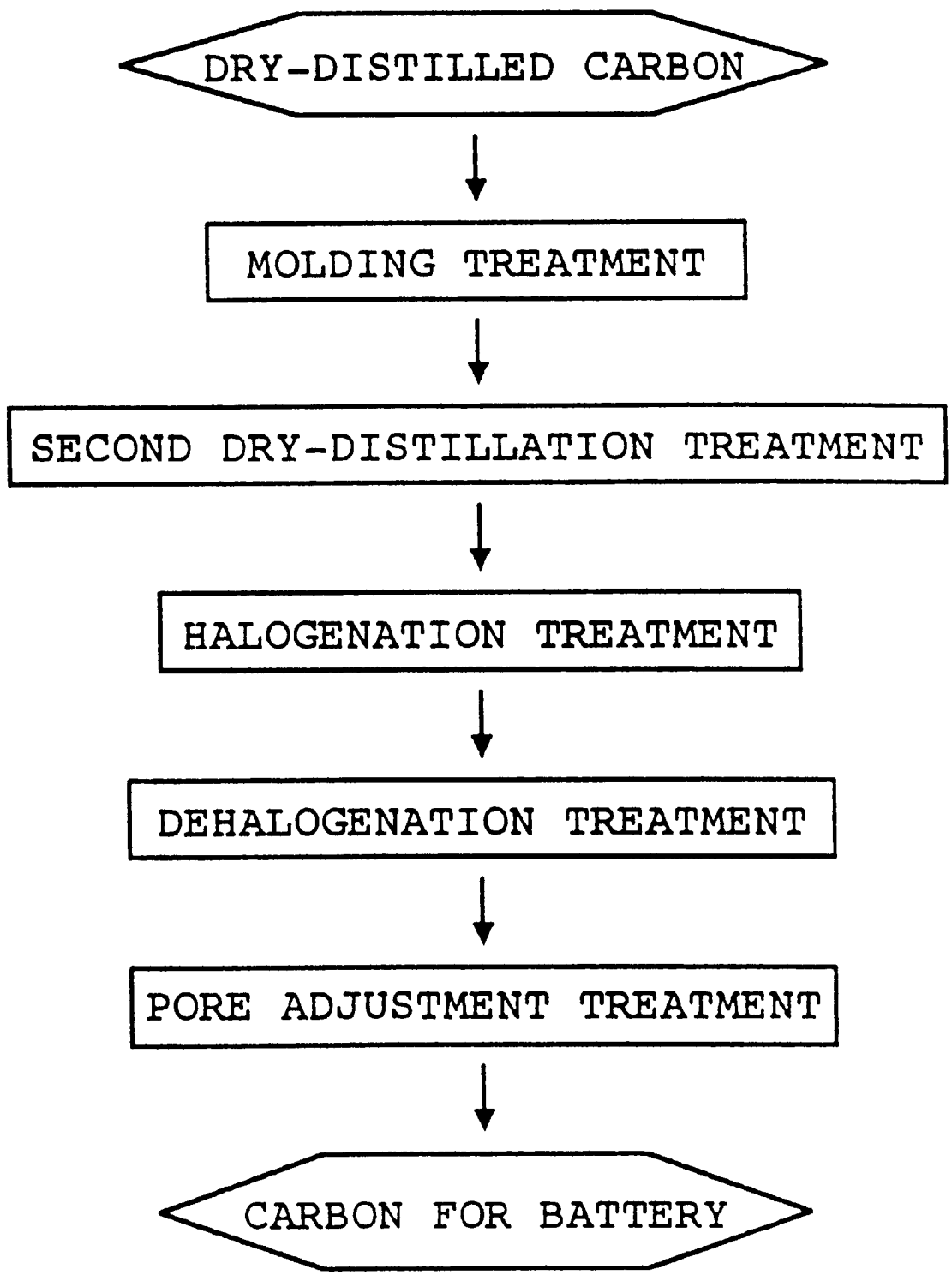
FIG. 5C is a process diagram showing yet another manufacturing method according to a third mode of the present invention.

According to the manufacturing method for a carbon for a lithium battery shown in the FIG. 5C, the molding step of the manufacturing method of the first mode shown in FIG. 1A is conducted by giving a molding treatment to the above-mentioned dry-distilled charcoal by the addition of an organic binding agent. Then after this molding treatment, a second carbonization step is conducted in which a second carbonization treatment is conducted in which this organic binding agent is carbonized by heating the dry-distilled charcoal which has been given the above-mentioned molding treatment in an inert gas. Then, after this second carbonization step, the above-mentioned halogenation treatment is conducted, and thereby, a carbon for a lithium secondary battery is manufactured.

In this third mode, the dehalogenation step is preferably a step in which at least one of a high temperature dehalogenation treatment and a low temperature dehalogenation treatment is conducted.

The starting materials used by the manufacturing method according to this second mode are the same as the starting materials in the above-mentioned first mode, that is, various starting materials such as carbonized plant and animal material such as lignite, brown coal, anthracite coal, coke, wood charcoal, coconut shell char; any kind of resin such as phenol resin, furan resin, vinylidene chloride copolymer, etc., and from among these, phenol resin is preferably used.

These starting materials are made into dry-distilled charcoal by means of suitably heating at a temperature of 550~1100 in an inert gas such as nitrogen or argon.

In this dry distillation, in order to manufacture uniform dry-distilled charcoal from the starting material carbon compound, it is preferable to make the starting material carbon compound into granules or cylinders of several millimeters, and then dry-distill it in an inert gas. In addition, powdered carbon material may also be molded by the addition of organic binder, and then dry-distilled.

In the halogenation treatment of the manufacturing method of a carbon for a lithium secondary battery of this third mode, any halogen can be used, but chlorine gas and bromine gas are preferably used.

By means of the above-mentioned halogenation treatment, halogenated dry-distilled charcoals such as a chlorinated dry-distilled charcoal having an atomic ratio of chlorine to carbon (Cl/C) of 0.03 or greater, and preferably of 0.07 or greater, and a brominated dry-distilled charcoal having an atomic ratio of bromine to carbon (Br/C) of 0.01 or greater, and preferably 0.03 or greater can be obtained. Moreover, it is not desirable for this atomic ratio to be less than the above-mentioned minimum values, since the formation of micropores is insufficient, and when the manufactured carbonaceous material is used in lithium secondary batteries, good charging and discharging properties cannot be obtained. In addition, the upper limit of the above-mentioned atomic ratio is determined by the carbonization temperature and the quantity of hydrogen atoms in the halogenated dry-distilled charcoal, and is not particularly limited; however, it is understood that when it is 0.315 or less, when the carbonaceous material is used in a lithium secondary battery, improvements in the charging and discharging properties can be obtained.

When the dry-distilled charcoal or the halogenated dry-distilled charcoal are in a lumpy or pellet form, they can be crushed in order to make the molding treatment easier. In this crushing treatment, the dry-distilled charcoal or the halogenated dry-distilled charcoal is crushed to an average particle size of several $\mu$m to tens of $\mu$m using normal crushing treatment methods such as a vibrating ball mill.

However, since it is possible to dry-distill starting material carbon compound in powdered form, and to conduct a halogenation treatment on dry-distilled charcoal in a powdered form, when dry-distilled charcoal in a powdered form or halogenated dry-distilled charcoal in a powdered form have been obtained, a crushing treatment is unnecessary.

The molding treatment is conducted by kneading powdered dry-distilled charcoal or halogenated dry-distilled charcoal to which an organic binding agent has been added, inserting it into a metallic mold, and press molding. The molding pressure is not particularly limited, and with a usual pressure of 500 kgf/cm$^2$, a suitable molded article can be obtained. Moreover, the molding method is not limited to press molding methods, molding methods which are generally conducted such as extrusion molding methods can be applied.

As the organic binding agent used in this molding treatment, those organic binding agents which are used in general molding treatments such as polyvinylidene fluoride, polyvinyl acetate, polyvinyl alcohol, polyvinyl pyrrolidone, acrylic resin, urea resin, melamine resin, phenol resin, epoxy resin, glycerin, dextrin, starch, syrup, pitch, coal tar, and the like may be used.

In addition to this, in order to adjust the fluidity, it is preferable to add a solvent such as ethanol, cyclohexane, acetone, benzene, toluene, etc., and in order to improve mold separation properties, it is preferable to add a mold separation agent such as liquid paraffin.

When the amount of organic binding agent added is too great, efficiency as an electrode is reduced, and when it is too small, physical strength when made into a molded article is reduced, therefore, suitable combinations are added with consideration to efficiency as an electrode and to the physical strength of the molded body. When phenol resin is used as the organic binding agent, the total of the phenol resin, the solvent, and the liquid paraffin added is preferably 30~60 parts by weight with regard to 100 parts by weight of halogenated dry-distilled charcoal.

The second carbonization treatment is a treatment conducted for the purpose of carbonizing the organic binding agent added in the molding treatment, and is a heat treatment in an inert gas such as nitrogen. The rate of temperature increase is 20~500° C./h and preferably 50~400° C./h. When the temperature increase is less than 20° C./h, a long treatment time is necessary and efficiency is poor, and when 500° C./h is exceeded, distortion and damage develop in the molded article, therefore, these conditions are not desirable. It is sufficient for the treatment temperature to be set at a temperature at which the organic binding agent is carbonized.

In the carbonization treatment, the object is mainly the carbonization of the organic binding agent in the molded article by means of heating the above-mentioned molded article, however, it also has the effect of eliminating some of the halogen in the halogenated dry-distilled charcoal.

In the carbonization treatment, the above-mentioned organic binder is carbonized by means of a treatment of heating the molded article to 450°~1300° C., and preferably to 550~900° C. in an inert gas such as nitrogen or argon. When less than 450° C. the carbonization is insufficient, and when 1300° C. is exceeded pore structure formation is badly effected.

In addition, the heating rate (rate of temperature increase) for the carbonization treatment is preferably 20~500° C./h, and more preferably 50~400° C./h. When the heating rate is less than 20° C./h, the treatment time is long and efficiency is poor, and when 500° C. is exceeded, cracks and warping develop in the molded article, and a suitable shape can not be obtained.

The low temperature dehalogenation treatment is a treatment in which a halogen is eliminated by putting the molded article in lower hydrocarbon gas or steam diluted with an inert gas such as nitrogen gas or argon, and heating it, and is conducted at 600~850° C., and preferably at 650~750° C. When the temperature of this dehalogenation treatment is less than 600° C., a long period of time is required for completion of dehalogenation, therefore, this is not preferable. In addition, the low temperature dehalogenation treatment is a treatment in which the halogen is eliminated by heating the molded article in hydrogen gas diluted with an inert gas, and is conducted at a temperature of 600~1400° C., and preferably at 650~1200° C. When this dehalogenation temperature is less than 600° C., a long period of time is required for completion of the dehalogenation, therefore, this is not preferable.

In addition, when the temperature exceeds 850° C., and the above-mentioned hydrogen compound is steam, the activation effects due to the steam are large; and when the above-mentioned hydrogen compound is a hydrocarbon, impregnation due to thermal decomposition occurs, and in both situations, the formation of pore structure is badly effected, carbon yield is reduced, and the improved effects in the charging and discharging characteristics when the carbonaceous material is used in lithium secondary battery are not sufficiently obtained, therefore, these situations are not desirable. However, when the hydrogen compound is hydrogen, since there are no carbon impregnation effects due to activation effects or thermal decomposition, the upper limit for the above-mentioned dehalogenation temperature can be 1400° C. At high temperatures exceeding 1400° C., there are negative effects on the pore structure formation in the carbon.

In addition, the heating rate of the dehalogenation treatment is preferably 20~500° C./h, and more preferably 50~400° C./h. When the heating rate is less than 20° C./h, the treatment time is long and efficiency is poor, and when 500° C./h is exceeded, cracks and warping develop in the molded article, and a suitable shape cannot be obtained.

The time for this dehalogenation treatment is preferably about 20~60 minutes.

In the dehalogenation treatment, the halogen in the dry-distilled charcoal is mainly eliminated as halogenated hydrogen such as hydrogen chloride and hydrogen bromide, and as a result hydrogen chloride and hydrogen bromide can be detected in the exhaust gas.

Here, as the hydrogen compound gas, for example, steam ($H_2O$); hydrogen; lower hydrocarbons, such as methane ($CH_4$), ethane ($C_2H_6$), ethylene ($C_2H_4$), propane ($C_3H_8$), propylene ($C_3H_6$), butane ($C_4H_{10}$), and butylene ($C_4H_8$); and mixtures of these gases can be used. As a hydrogen compound gas in an inert gas, the exhaust gas of LPG (liquid petroleum gas) which has been incompletely burned is suitable for industrial use. The composition of the above-mentioned exhaust gas is, for example, steam: 13~17% by volume; carbon dioxide: 9~12% by volume; carbon monoxide: 0.01~1% by volume; nitrogen: 68~74% by volume; and unburned lower hydrocarbons: 0.01~3% by volume.

When the above-mentioned hydrogen compound is steam, the concentration of the steam is not particularly limited; however, when the superficial velocity in the column is from 0.05 to 0.15 NL/(min.cm$^2$), 3% by volume is sufficient.

When the above-mentioned hydrogen compound is a lower hydrocarbon such as methane, the concentration of the lower hydrocarbon is not particularly limited; however, when the superficial velocity in the column is from 0.05 to 0.15 NL/(min.cm$^2$), 40% by volume is sufficient.

The high temperature dehalogenation treatment is a treatment in which the halogen is eliminated by putting the molded article in an atmosphere of inert gas such as nitrogen gas or argon gas, or under vacuum evacuation, and then heating, and is preferably conducted at a temperature of 700~1400° C., and preferably 800~1300° C. In the high temperature dehalogenation treatment, along with the action of eliminating halogen, there is also the action of reducing porosity by heat shrinking the entire porous carbon. When the temperature of this treatment is less than 700° C., the effects of dehalogenation become difficult to obtain., and when 1400° C. is exceeded, the heat shrinkage effects are too great, and therefore these situations are not desirable. When the above-mentioned carbonization treatment is conducted, the high temperature dehalogenation treatment can be omitted.

A time of 30~120 minutes are necessary for this high temperature dehalogenation treatment. The degree of evacuation for the vacuum evacuation is not particularly limited, however, approximately 10 Torr is suitable.

The density of the molded article which has been given the high temperature dehalogenation treatment is 0.70~1.20 g/cm$^3$, and the pore volume is 0.15~0.4 cm$^3$/g.

In this third mode, the preferable dehalogenation step is any one of a step in which a high temperature dehalogenation treatment or a low temperature dehalogenation treatment is independently conducted; a step in which a high temperature dehalogenation treatment and then a low temperature dehalogenation treatment are conducted; and a step in which a low temperature dehalogenation treatment and then a high temperature dehalogenation treatment are conducted. The atomic ratio for the halogen which remains after the dehalogenation treatment with regard to the carbon is preferably a 0.02 or less for a chlorination treatment (Cl/C), and 0.01 or less for a bromination treatment (Br/C), however, these are not limitations and the effects of the present invention can be obtained even if some part of the halogen remains.

The pore adjustment treatment is a treatment in which the carbonaceous material (electrode carbon precursor) obtained by means of the dehalogenation treatment is heated in a thermally decomposable hydrocarbon diluted with an inert gas at a temperature of 600~1100° C., preferably at 700~1050° C., and more preferably at 800~1000° C. When this heating temperature exceeds 1100° C., it is difficult to control the amount of impregnation of the thermally decomposed carbon, and when it is less than 600° C., the rate of thermal decomposition of the thermally decomposable hydrocarbon is slow, and a long period of time is necessary for the pore adjustment, and this situation is not desirable.

The time for the pore adjustment treatment is preferably 5~180 minutes.

From after the above-mentioned dehalogenation treatment until the start of the above-mentioned pore adjustment treatment, it is preferable for the electrode carbon precursor to be handled in an inert gas such as nitrogen or argon. By means of handling the electrode carbon precursor in an inert gas in this way, since it is possible to prevent the electrode carbon precursor from reactions and adsorption of oxygen and water, the effects of pore adjustment are sufficiently obtained.

The assembly step for a lithium secondary battery which uses the carbon for electrode obtained by means of the above-mentioned manufacturing method is preferably handled in a dried inert gas. In more detail, when oxygen and water are absorbed or become adsorbed to the carbon for electrode or electrolytic solution, battery efficiency is reduced, therefore it is preferable that preservation of the carbon for electrode after the completion of the pore adjustment treatment, electrolytic solution immersion, and battery assembly be conducted in a dry inert gas.

The carbon for a lithium secondary battery obtained by means of the above-mentioned manufacturing method has a density of 0.70~1.20 g/cm$^3$, and when used as a negative electrode for a lithium secondary battery, high total discharge capacity, high total discharge efficiency, and superior discharging characteristics are obtained.

EXAMPLES

In the following, examples according to the present invention are described, however, the following description are only illustrations of the present invention, and the present invention is not limited to these following examples.

EXAMPLES ACCORDING TO THE FIRST MODE

As Examples of the first mode, the carbonaceous materials of Examples 1~9 were manufactured according to the present invention, and their charging and discharging characteristics are compared with the carbonaceous materials of Comparative Examples 1~3.

Dry Distilled Charcoal

The dry-distilled charcoal starting material was obtained by adding phenol resin (PGA-4560, product name: Resitop, manufactured by Gun-ei Chemical Industry (Ltd)) as a binder to phenol resin (R800, product name: BELL PEARL, manufactured by Kanebo Co., Ltd., molding it into a cylindrical shape of approximately 2 mm×5~6 mm, and then dry-distilling it at 700° C. under a nitrogen gas current.

Halogen Treatment

A porous carbonaceous material was made by conducting the following halogen treatment on the dry-distilled charcoal starting material.

Dry distilled charcoal starting material (approximately 15 g) was chlorinated by a heat treatment for 2 hours at 600° C. under a current of nitrogen gas (2.7 NL/min) containing chlorine at 5% by volume. Next, it was dechlorinated by a heat treatment for 30 minutes at a temperature of 700° C. under a current of nitrogen gas (3 NL/min) containing methane at 40% by volume, or which had been saturated with steam at 25° C.

In the bromine treatment, bromination was conducted by a heat treatment for 2 hours at a temperature of 600° C. under a current of nitrogen gas (3 NL/min) containing bromine gas at 5% by volume. Next, debromination was conducted by heating for 30 minutes at a temperature of 700° C. under a current of nitrogen gas (3 NL/min) which had been saturated with steam at 25° C.

The high temperature dehalogenation treatment was conducted by a heat treatment for 60 minutes at a temperature of 800° C., 1000° C., or 1300° C., under a nitrogen gas current (3 NL/min).

Pore Adjustment Treatment

The pore adjustment treatment was conducted by crushing the carbon which had been given the dehalogenation treatment (the average particle size was several to several tens of μm), and then giving it a heat treatment for 10 minutes at a temperature of 900° C. under a current of nitrogen gas (3 NL/min) which had been saturated with benzene at 25° C. In addition, Examples in which the crushing was conducted after the pore adjustment was given were also conducted.

In addition, each of the above-mentioned treatments was conducted at approximately atmospheric pressure. After the dehalogenation treatment, preservation was in dry nitrogen gas.

Equipment for the Halogen Treatment and the Pore Adjustment Treatment

Figure 6:
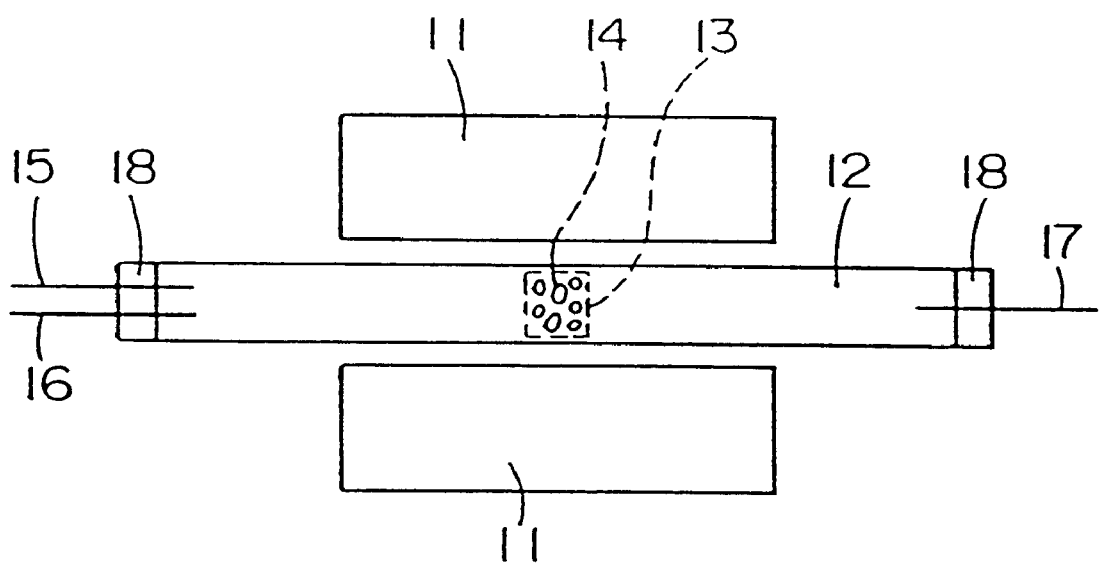
FIG. 6 is an outline diagram of the equipment for conducting the halogen treatment and the pore adjustment treatment.

An outline of the equipment for conducting the halogen treatment and the pore adjustment treatment is shown in FIG. 6. In the Figure, 11 is a pipe shaped electric kiln which is equipped with a temperature control device (the pipe shaped kiln is manufactured by Yoshida Seisakusho, the temperature control device is a thermocouple, JIS R, Model SU manufactured by Chino); 12 is a quartz pipe; 13 is a gas permeable container for carbonaceous material; 14 is a carbonaceous material; 15 is a nitrogen gas supply pipe; 16 is a supply pipe for halogen gas, steam, methane, thermally decomposable hydrocarbon, and the like; 17 is an exhaust gas output pipe; and 18 is a rubber stopper. In the halogenation treatment, nitrogen flows at a predetermined rate from pipe 15, and chlorine gas or bromine gas flows at a predetermined rate from pipe 16. In the low temperature dehalogenation treatment, a gas containing methane or steam flows from pipe 16 at a predetermined rate. In the high temperature dehalogenation treatment, nitrogen gas flows from pipe 15 at a predetermined rate. In the pore adjustment treatment, gas containing thermally decomposable hydrocarbon flows from pipe 16 at a predetermined rate. The flow rates of the gas were measured by a float-type area flowmeter (chlorine gas: PGF-N model manufactured by Ryutai Kogyo (Ltd); other gases: ST-4 model manufactured by Nippon Flowcell Co.). The flowmeter used for the chlorine gas was corrected and used for the bromine gas.

Crushing

Crushing was conducted for 30 minutes using small size vibrating ball mill, NB-0, manufactured by Nitto Kagaku (Ltd)). The container of the vibrating ball mill was filled with dry nitrogen gas. For the period after crushing and until the pore adjustment, preservation was also in dry nitrogen gas.

Carbon For Battery

The carbon obtained by the halogen treatment (chlorination treatment or bromination treatment), crushing treatment, or pore adjustment treatment was made into carbon for a battery (in a coin shape of 10 mm in diameter and 0.5 mm in thickness) by being made into a paste by the addition of polyvinyl fluoride equivalent to 9% by volume of carbon, and N-methyl-2-pyrrolidone, and then made into a sheet on a stainless steel plate for collecting electrode use.

Evaluation Test for Charging and Discharging Capacity

The electrolytic solution (1.0 mol/L) used was a solution of a one to one mixture of polycarbonate and dimethoxy-ethane to which lithium perchlorate ($LiClO_4$) was added as a supporting electrolyte. A carbon electrode was formed by impregnating the above-mentioned carbon for a battery with the electrolytic solution.

With regard to charging and discharging, the above-mentioned total charging capacity (A), total discharge capacity (B), effective discharge capacity (C), and fixed current discharging capacity (D) were measured using a charging and discharging testing device (model HJ-201B) manufactured by Hokuto Denko (Ltd).

COMPARATIVE EXAMPLE 1

No Halogen Treatment, 800° C. Heat Treatment

Dry distilled charcoal was given a heat treatment at a temperature of 800° C. under a current of nitrogen gas, and this was then crushed. Next, a pore adjustment treatment was conducted, binder added, carbon for a battery made, and the charging and discharging characteristics were measured using an evaluation cell. The results were A=775 mAh/g, B=570 mAh/g, C=256 mAh/g, and D=511 mAh/g. The total discharge efficiency K(B/A) equals 73.5%, and the effective discharge ratio K(C/D) equals 50.1%.

COMPARATIVE EXAMPLE 2

No Halogen Treatment, 1000° C. Heat Treatment

With the exception that the heat treatment temperature was 1000° C., the treatment was conducted under the same conditions as in Comparative Example 1. The charging and discharging characteristics were measured. The results were A=721 mAh/g, B=567 mAh/g, C=330 mAh/g, and D=541 mAh/g. The total discharge efficiency K(B/A) equals 78.6%, and the effective discharge ratio K(C/D) equals 61.0%.

COMPARATIVE EXAMPLE 3

No Halogen Treatment, 1300° C. Heat Treatment

With the exception that the heat treatment temperature was 1300° C., the treatment was conducted under the same conditions as in Comparative Example 1. The charging and discharging characteristics were measured. The results were A=396 mAh/g, B=320 mAh/g, C=164 mAh/g, and D=301 mAh/g. The total discharge efficiency K(B/A) equals 80.8%, and the effective discharge ratio K(C/D) equals 54.5%.

EXAMPLE 1

Chlorine Treatment, 1000° C. High Temperature Dechlorination, Steam Dechlorination, Crushing Conducted After Pore Adjustment Dry distilled carbon was given a chlorination treatment, next it was heated (high temperature dechlorination) to a temperature of 1000° C. under a nitrogen gas current, and, additionally, a dechlorination treatment (low temperature dechlorination treatment) was conducted by heating under a current of nitrogen gas which contained steam. After giving this a pore adjustment treatment, it was crushed to an average particle size of approximately 13 μm, then carbon for a battery was made by the above-mentioned method, and the charging and discharging characteristics were measured using an evaluation cell. The results were A=750 mAh/g, B=627 mAh/g, C=390 mAh/g, and D=604 mAh/g. The total discharge efficiency K(B/A) equals 83.6%, and the effective discharge ratio K(C/D) equals 64.6%.

EXAMPLE 2

Chlorine Treatment, Steam Dechlorination, 800° C. High Temperature Dechlorination, Crushing Conducted After Pore Adjustment Dry distilled carbon was given a chlorination treatment, then a dechlorination treatment (low temperature dechlorination treatment) was conducted by heating under a current of nitrogen gas which contained steam, and, next, a heating treatment (high temperature dechlorination) to a temperature of 800° C. under a nitrogen gas current was conducted. After giving this a pore adjustment treatment, it was crushed to an average particle size of approximately 13 μm, then carbon for a battery was made by the above-mentioned method, and the charging and discharging characteristics were measured using an evaluation cell. The results were A=777 mAh/g, B=606 mAh/g, C=312 mAh/g, and D=553 mAh/g. The total discharge efficiency K(B/A) equals 78.0%, and the effective discharge ratio K(C/D) equals 56.4%.

EXAMPLE 3

Chlorine Treatment, Steam Dechlorination, 1000° C. High Temperature Dechlorination, Crushing Conducted After Pore Adjustment Carbon for a battery was made under the same conditions as for Example 2 with the exception that the temperature of the heating (high temperature dechlorination treatment) in nitrogen gas was 1000° C. The results of the measurement of the charging and discharging characteristics were A=754 mAh/g, B=642 mAh/g, C=413 mAh/g, and D=618 mAh/g. The total discharge efficiency K(B/A) equals 85.1%, and the effective discharge ratio K(C/D) equals 66.8%.

EXAMPLE 4

Chlorine Treatment, Steam Dechlorination, 1000° C. High Temperature Dechlorination, Crushing Conducted After Pore Adjustment Carbon for a battery was made under the same conditions as for Example 3 with the exception that the average particle size of the crushed carbon was approximately 9 μm. The results of the measurement of the charging and discharging characteristics were A=738 mAh/g, B=603 mAh/g, C=372 mAh/g, and D=582 mAh/g. The total discharge efficiency K(B/A) equals 81.7%, and the effective discharge ratio K(C/D) equals 63.9%.

EXAMPLE 5

Chlorine Treatment, Steam Dechlorination, 800° C. High Temperature Dechlorination Dry distilled carbon was given a chlorination treatment, and then a dechlorination treatment (low temperature dechlorination treatment) by heating under a current of nitrogen gas which contained steam. Next, it was heated (high temperature dechlorination) at a temperature of 800° C. under a nitrogen gas current, crushed, and additionally given a pore adjustment treatment. The charging and discharging characteristics of this carbon were measured using an evaluation cell. The results were A=778 mAh/g, B=622 mAh/g, C=342 mAh/g, and D=574 mAh/g. The total discharge efficiency K(B/A) equals 79.9%, and the effective discharge ratio K(C/D) equals 59.6%.

EXAMPLE 6

Chlorine Treatment, Methane Dechlorination, 1000° C. High Temperature Dechlorination The treatment was conducted under the same conditions as in Example 5 with the exceptions that the dechlorination (low temperature dechlorination treatment) was conducted by a heat treatment under a nitrogen gas current which contained methane, and that the temperature of the heating (high temperature dechlorination) under a nitrogen gas current was 1000° C. The charging and discharging characteristics were measured. The results were A=771 mAh/g, B=679 mAh/g, C=453 mAh/g, and D=658 mAh/g. The total discharge efficiency K(B/A) equals 88.1%, and the effective discharge ratio K(C/D) equals 68.8%.

EXAMPLE 7

Chlorine Treatment, Methane Dechlorination, 1300° C. High Temperature Dechlorination The treatment was conducted under the same conditions as in Example 5 with the exceptions that the dechlorination (low temperature dechlorination treatment) was conducted by a heating treatment under a nitrogen gas current which contained methane, and that the temperature of the heating (high temperature dechlorination) under a nitrogen gas current was 1300° C. The charging and discharging characteristics were measured. The results were A=471 mAh/g, B=404 mAh/g, C=237 mAh/g, and D=387 mAh/g. The total discharge efficiency K(B/A) equals 85.8%, and the effective discharge ratio K(C/D) equals 61.2%.

EXAMPLE 8

Bromine Treatment, Steam Debromination, 800° C. High Temperature Dechlorination

Dry distilled carbon was brominated under a current of nitrogen gas which contained bromine gas at 5% by volume. Next, it was debrominated (low temperature debromination treatment) by heating under a current of nitrogen gas which contained steam. Then, it was heated (high temperature debromination) at a 800° C. under a nitrogen gas current, crushed, and additionally given a pore adjustment treatment. The charging and discharging characteristics of this carbon were measured. The results were A=780 mAh/g, B=624 mAh/g, C=355 mAh/g, and D=576 mAh/g. The total discharge efficiency K(B/A) equals 80.0%, and the effective discharge ratio K(C/D) equals 61.6%. Desirable charging and discharging performances were obtained for bromination treatments as well.

EXAMPLE 9

Bromine Treatment, Steam Debromination, 1000° C. High Temperature Debromination

Carbon was made under the same conditions as in Example 8 with the exception that the temperature of the heating (high temperature debromination treatment) in nitrogen gas was 1000° C. The results of the measurement of the charging and discharging characteristics of this carbonaceous material were A=774 mAh/g, B=683 mAh/g, C=467 mAh/g, and D=660 mAh/g. The total discharge efficiency K(B/A) equals 88.2%, and the effective discharge ratio K(C/D) equals 70.8%. Desirable charging and discharging performances were obtained for bromination treatments as well.

The treatment conditions, and the charging and discharging characteristics for the Examples and the Comparative Examples are shown in Table 1.

TABLE 1

|  | [1] | [2] | [3] | A mAh/g | B mAh/g | C mAh/g | D mAh/g | K (B/A) % | K (C/D) % |
|---|---|---|---|---|---|---|---|---|---|
| Comparative Example 1 | none | 800 | powder | 775 | 570 | 256 | 511 | 73.5 | 50.1 |
| Comparative Example 2 | none | 1000 | powder | 721 | 567 | 330 | 541 | 78.6 | 61.0 |
| Comparative Example 3 | none | 1300 | powder | 396 | 320 | 164 | 301 | 80.8 | 54.5 |
| Example 1 | chlorine | 1000 | powder | 750 | 627 | 390 | 604 | 83.6 | 64.6 |
| Example 2 | chlorine | 800 | powder | 777 | 606 | 312 | 553 | 78.0 | 56.4 |
| Example 3 | chlorine | 1000 | powder | 754 | 642 | 413 | 618 | 85.1 | 66.8 |
| Example 4 | chlorine | 1000 | powder | 738 | 603 | 372 | 582 | 81.7 | 63.9 |
| Example 5 | chlorine | 800 | powder | 778 | 622 | 342 | 574 | 79.9 | 59.6 |
| Example 6 | chlorine | 1000 | powder | 771 | 679 | 453 | 658 | 88.1 | 68.8 |
| Example 7 | chlorine | 1300 | powder | 471 | 404 | 237 | 387 | 85.8 | 61.2 |
| Example 8 | bromine | 800 | powder | 780 | 624 | 355 | 576 | 80.0 | 61.6 |
| Example 9 | bromine | 1000 | powder | 774 | 683 | 467 | 660 | 88.2 | 70.8 |

Numbers in the Table
[1] Halogen Treatment
[2] Temperature of the Heating Conducted in a Nitrogen Gas Current ° C.
[3] Condition of the Carbon Electrodes made by giving a dry-distilled charcoal a chlorine treatment, conducting a pore adjustment on it, then crushing it, and adding a binding agent (Examples 1~4) were superior in total discharge capacity, effective discharge capacity, total discharge efficiency, and effective discharge ratio when compared with Comparative Examples which were not given a chlorine treatment. In this case, better performance was obtained for a larger particle size for the crushing conducted after the pore adjustment than for a smaller one. Examples 5~7 in which the pore adjustment was conducted after conducting the chlorination treatment and the crushing treatment had better performance when compared with methods in which the crushing was conducted after the pore adjustment. In addition, better performance was obtained for bromination treatments when compared with the Comparative Examples.

The factor of the improvement in performance for each of Examples 5~7 (in which a chlorination treatment was given) are shown in Table 2 using the Comparative Examples (in which a chlorination treatment was not given) as a standard, for situations in which the temperature of the heating in the nitrogen gas current was the same. Each of the total discharge capacity, the effective discharge capacity, the total discharge efficiency, and the effective discharge ratio improved. Total discharge capacity was greatest at a factor of 1.26 (a 26% increase), the effective discharge capacity was greatest at a factor of 1.45 (a 45% increase), the total discharge efficiency was greatest at a factor of 1.12 (a 12% increase), and the effective discharge ratio was greatest at a factor of 1.19 (a 19% increase).

TABLE 2

| Temperature of heating in nitrogen current | | Total Discharge Capacity | Effective Discharge Capacity | Total Discharge Efficiency | Effective Discharge Ratio |
| --- | --- | --- | --- | --- | --- |
| 800° C. | Example 5/Comparative Example 1 | 1.09 | 1.34 | 1.09 | 1.19 |
| 1000° C. | Example 6/Comparative Example 2 | 1.20 | 1.37 | 1.12 | 1.13 |
| 1300° C. | Example 7/Comparative Example 3 | 1.26 | 1.45 | 1.06 | 1.12 |

Figure 7:
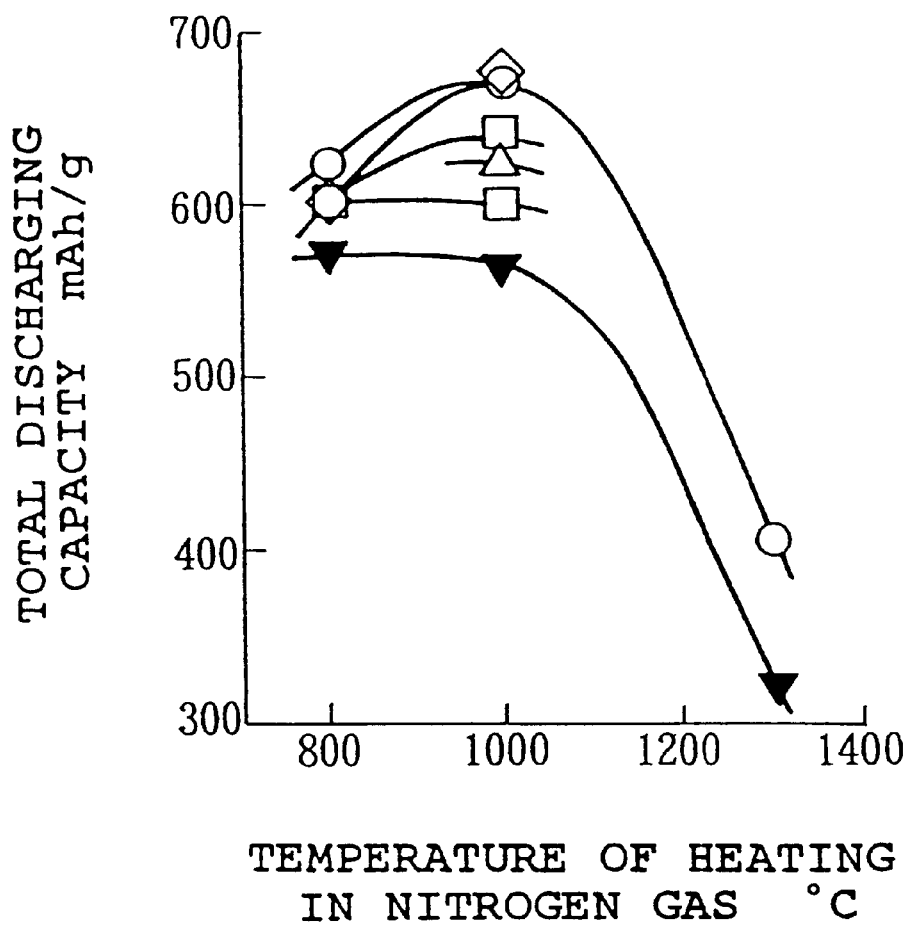
FIG. 7 is a graph showing the relationship between the temperature of the heating conducted in nitrogen gas and the total discharge capacity.
Figure 8:
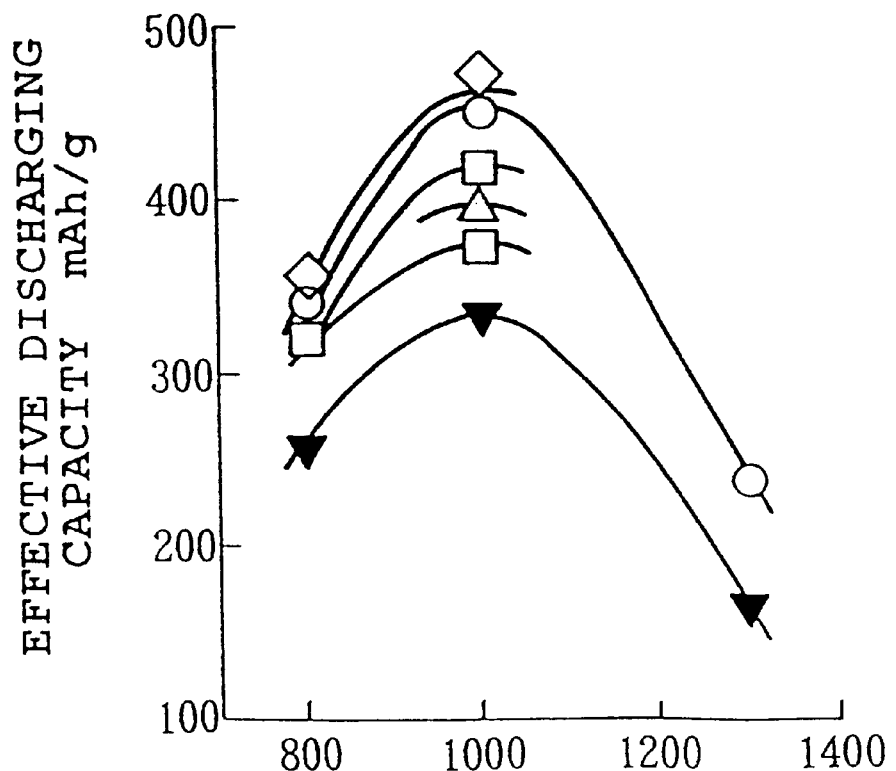
FIG. 8 is a graph showing the relationship between the temperature of the heating conducted in nitrogen gas and the effective discharge capacity.
Figure 9:
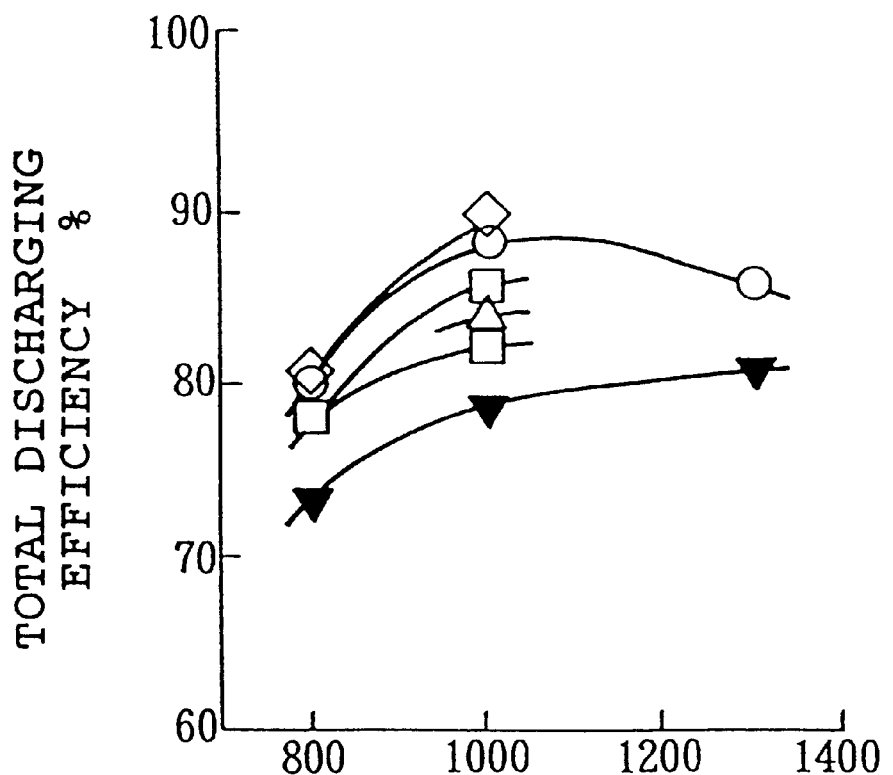
FIG. 9 is a graph showing the relationship between the temperature of the heating conducted in nitrogen gas and the total discharge efficiency.
Figure 10:
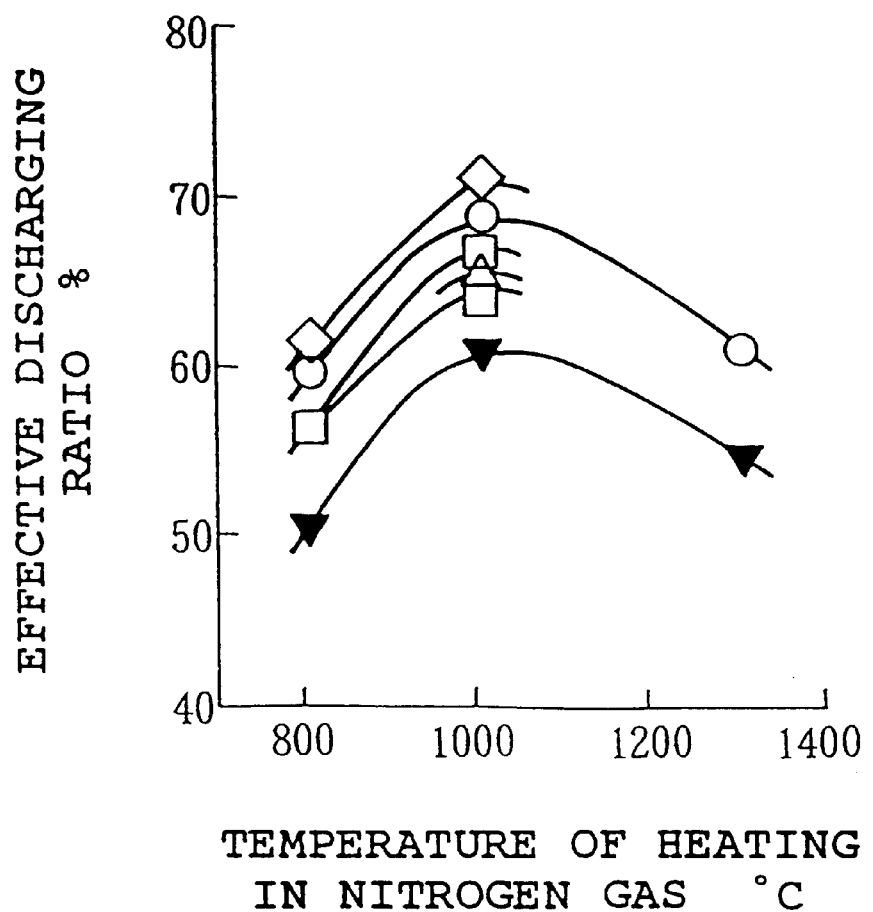
FIG. 10 is a graph showing the relationship between the temperature of the heating conducted in nitrogen gas and the effective discharge ratio.

Data for the Examples according to the first mode and for the Comparative Examples are shown in FIG. 7 (total discharge capacity), FIG. 8 (effective discharge capacity), FIG. 9 (total discharge efficiency), and FIG. 10 (effective discharge rate).

In every case, the Examples show greater values than the Comparative Examples in which the temperature for the heating in the nitrogen gas current was the same.

Figure 11:
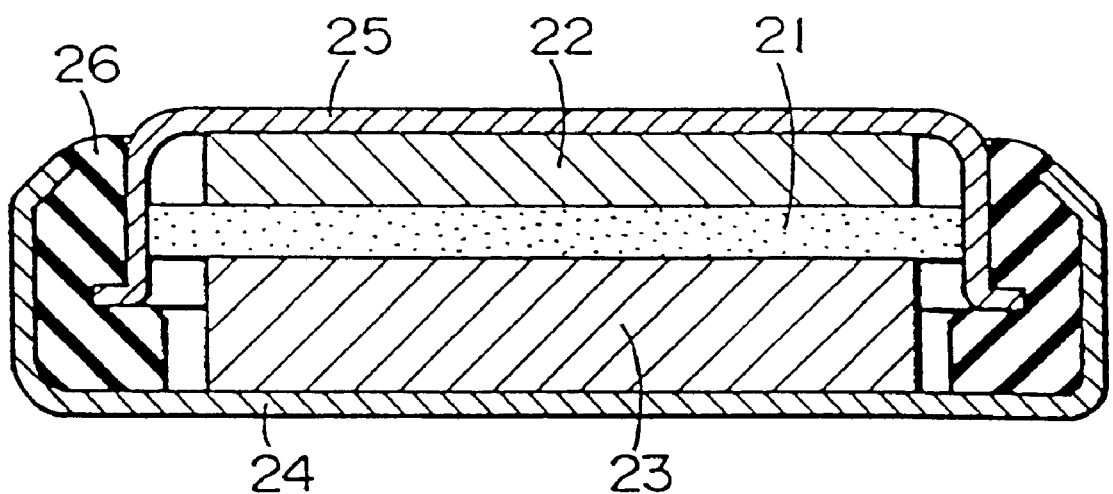
FIG. 11 is a cross-section diagram showing an example of a lithium secondary battery.

Coin shaped lithium secondary batteries like the one shown in FIG. 11 were manufactured using carbon manufactured according to the above-mentioned Examples 1 through 9. These lithium secondary batteries are made into a structure in which a positive electrode 22 (the main component of which is $LiCoO_2$) and a negative electrode 23 (comprising the carbon electrode manufactured in the Examples) are positioned on opposite sides of separator 21 which has been impregnated with organic solvent containing lithium ions as an electrolyte; the periphery of these is covered by metallic casing 24 and cap 25; and the boundary between casing 24 and cap 25 is fixed in an insulated condition by means of packing 26.

The results from examination of the charging and discharging characteristics of these lithium secondary batteries by means of the above-mentioned battery charging and discharging tests confirmed performance improvements the same as those obtained for the above-mentioned evaluation cell.

EXAMPLES ACCORDING TO THE SECOND MODE

For Comparative Example 4, carbon for a battery was manufactured by a process of dry distillation→heat-treatment→crushing treatment. For Comparative Examples 5~7, carbon for a battery was manufactured by a process of dry distillation→heat treatment→crushing treatment→pore adjustment treatment.

For Example 10, carbon for a battery was manufactured by a process of dry distillation→crushing treatment→molding treatment→carbonization treatment. For Examples 11~13, carbon for a battery was manufactured by a process of dry distillation→crushing treatment→molding treatment→carbonization treatment→pore adjustment treatment.

For the dry-distilled charcoal starting material, the dry-distilled charcoal of the Examples of the above-mentioned first mode was used.

The conditions for the dry distilled carbon as well as for the crushing treatment and the pore adjusting treatment were the same as the condition recited in the Examples of the first mode. The molding treatment, the carbonization treatment, and the manufacture of the carbon for a battery were conducted under the following conditions.

Molding Treatment 15 parts by weight of phenol resin and 8 parts by weight of ethanol were added to 100 parts by weight of powdered dry-distilled charcoal and kneaded, in addition, this was impregnated with 20 parts of liquid paraffin and kneaded, and then press molded at a pressure of 500 kgf/cm². This was hardened by drying for 1 hour at 160° C. The press molding equipment used was a RIKEN POWER D3.5-300 model manufactured by Riken Seiki (Ltd). The size of the molded article was 30×30×1 mm. The weight was approximately 1.2 g.

Carbonization Treatment

The carbonization treatment for Examples 10~13 was conducted by giving the molded article a heat treatment for 60 minutes at a temperature of 800° C.~1200° C. under a nitrogen gas current (3 NL/min) of approximately atmospheric pressure.

Heat Treatment

The heat treatment for Comparative Examples 4~7 was conducted by heat-treating a dry-distilled charcoal for 60 minutes at a temperature of 800° C.~1200° C. under a nitrogen gas current (3 NL/min) of approximately atmospheric pressure.

Pore Adjustment (Examples 11~13, Comparative Examples 5~7)

In the pore adjustment for the Examples, carbon (molded article) which had been given a carbonization treatment was made into a disk of predetermined size, and then heat-treated for 10 minutes at a temperature of 900° C. under a current (3 NL/min) of nitrogen which had been saturated with benzene at 25° C.

In the pore adjustment for the Comparative Examples, dry-distilled charcoal was crushed to an average particle size of several $\mu m$ to several tens of $\mu m$, and then heat-treated for 10 minutes at a temperature of 900° C. under a current (3 NL/min) of nitrogen which had been saturated with benzene at 25° C.

The pore adjustment was also conducted under conditions of approximately atmospheric pressure. After the pore adjustment treatment, the carbon for a battery was preserved in dry argon gas.

Carbon for Battery (Examples 10~13, molded article)

Carbon for a battery was made by cutting carbonization treated carbon into disks of 10 mm in diameter, and grinding them to a thickness of 0.2 mm. This operation was conducted in dry argon gas, and the carbon for a battery was preserved in dry argon gas. In addition, in dry nitrogen gas, carbonization treated carbon was made into carbon for a battery by cutting it into disks of 10 mm in diameter, grinding it to a thickness of 0.2 mm, and then giving it a pore adjustment. After that, the carbon for a battery was preserved in argon gas.

Carbon for Battery (Comparative Examples 4~7, Powdered Product)

Carbon which had been crushing treated or carbon which had been obtained by a pore adjustment conducted after a crushing treatment were made into a paste by the addition of polyvinyl fluoride equivalent to 9% by weight of carbon, and N-methyl-2-pyrrolidone, this was made into a sheet on a stainless steel plate for collecting electrode use, and thereby carbon for a battery (in a disk shape of 10 mm in diameter and 0.2 mm in thickness) was obtained. These operations were conducted in dry argon gas.

The evaluation tests for charging and discharging capacity were the same as the those for the Examples of the above-mentioned first mode.

The above-mentioned carbonization treatment, heat treatment, and pore adjustment treatment used the same equipment as that used in the Examples of the above-mentioned first mode. When conducting the carbonization treatment and the heating treatment using this equipment, nitrogen gas is run from pipe 15 at a predetermined rate. In the pore adjustment treatment, gas containing thermally decomposable hydrocarbon is run from pipe 16 at a predetermined rate.

Pore Volume and Density of the Molded Article

The density is calculated for the measurement of the volume and the weight.

Pore volume is calculated by measuring the amount of benzene adsorbed at saturation at 25° C., and dividing by the density of liquid benzene (0.879 g/cm$^3$).

COMPARATIVE EXAMPLE 4

No Pore Adjustment, Powdered Product

Dry distilled charcoal was heat-treated at a temperature of 1100° C. in a current of nitrogen gas, and then crushed. A binding agent was added to this carbon, carbon for a battery was made, and the charging and discharging properties were measured using an evaluation cell. The results were A=669 mAh/g, B=437 mAh/g, C=212 mAh/g, and D=399 mAh/g. The total discharge efficiency K(B/A) equals 65.3%, and the effective discharge ratio K(C/D) equals 53.1%.

EXAMPLE 10

No Pore Adjustment, Molded Article

Dry distilled charcoal was crushed, molded and carbonization-treated by heating at a temperature of 1100° C. in a current of nitrogen gas. Disked shaped carbon was made from this carbon, and the charging and discharging characteristics were measured using an evaluation cell. The results were A=731 mAh/g, B=485 mAh/g, C=249 mAh/g, and D=447 mAh/g. The total discharge efficiency K(B/A) equals 66.3%, and the effective discharge ratio K(C/D) equals 55.7%.

COMPARATIVE EXAMPLE 5

800° C. Heat Treatment, Powdered Product

Dry distilled charcoal was given a heat-treated at a temperature of 800° C. in a current of nitrogen gas, crushed, and then a pore adjustment treatment was conducted. Binding agent was added to this powdered carbonaceous material, carbon for a battery was made, and the charging and discharging characteristics were measured using an evaluation cell. The results were A=775 mAh/g, B=570 mAh/g, C=256 mAh/g, and D=511 mAh/g. The total discharge efficiency K(B/A) equals 73.5%, and the effective discharge ratio K(C/D) equals 50.1%.

COMPARATIVE EXAMPLE 6

1000° C. Heat Treatment, Powdered Product

This was conducted under the same conditions as for Comparative Example 5 with the exception that the temperature of the heat treatment was 1000° C. The charging and discharging characteristics were measured. The results were A=721 mAh/g, B=567 mAh/g, C=330 mAh/g, and D=541 mAh/g. The total discharge efficiency K(B/A) equals 78.6%, and the effective discharge ratio K(C/D) equals 61.0%.

COMPARATIVE EXAMPLE 7

1200° C. Heat Treatment, Powdered Product

This was conducted under the same conditions as for Comparative Example 5 with the exception that the temperature of the heat treatment was 1200° C. The charging and discharging characteristics were measured. The results were A=505 mAh/g, B=408 mAh/g, C=223 mAh/g, and D=390 mAh/g. The total discharge efficiency K(B/A) equals 80.8%, and the effective discharge ratio K(C/D) equals 57.2%.

EXAMPLE 11

800° C. Carbonization Treatment, Molded Article

Dry distilled charcoal was crushed, molded, carbonization-treated by heating at a temperature of 800° C. in a current of nitrogen gas, then ground, and thereby, a disk shaped carbonaceous material was manufactured. In addition, carbon for a battery was then made by conducting a pore adjustment treatment, and then the charging and discharging characteristics were measured. The results were A=860 mAh/g, B=671 mAh/g, C=307 mAh/g, and D=592 mAh/g. The total discharge efficiency K(B/A) equals 78.0%, and the effective discharge ratio K(C/D) equals 51.9%. The density of the carbonization treated molded article was 0.80 g/cm$^3$, and the pore volume was 0.23 cm$^3$/g. The density of the molded article of the carbon for a battery which was given a pore adjustment treatment was 0.81 g/cm$^3$.

EXAMPLE 12

1000° C. Carbonization Treatment, Molded Article

This was treated under the same conditions as Example 11 with the exception that the temperature of the carbonization treatment was 1000° C. The charging and discharging characteristics were measured. The results were A=782 mAh/g, B=651 mAh/g, C=397 mAh/g, and D=606 mAh/g. The total discharge efficiency K(B/A) equals 83.2%, and the effective discharge ratio K(C/D) equals 65.5%. The density of the carbonization treated molded article was 0.83 g/cm$^3$, and the pore volume was 0.26 cm$^3$/g. The density of the molded article of the carbon for a battery which was given a pore adjustment treatment was 0.84 g/cm$^3$.

EXAMPLE 13

1200° C. Carbonization Treatment, Molded Article

This was treated under the same conditions as Example 11 with the exception that the temperature of the carbonization treatment was 1200° C. The charging and discharging characteristics were measured. The results were A=553 mAh/g, B=476 mAh/g, C=270 mAh/g, and D=460 mAh/g. The total discharge efficiency K(B/A) equals 86.1%, and the effective discharge ratio K(C/D) equals 58.7%. The density of the carbonization treated molded article was 0.86 g/cm$^3$, and the pore volume was 0.25 cm$^3$/g. The density of the molded article of the carbon for a battery which was given a pore adjustment treatment was 0.87 g/cm$^3$.

The treatment conditions and the charging and discharging properties for Comparative Examples 4~7 and Examples 10~13 are shown in Table 3.

carbonization treatment temperature were the same, each of the total discharge capacity, the effective discharge capacity, the total discharge efficiency and the effective discharge ratio were better for the Examples 11~13, in which the carbon electrode was made into a disk shaped molded article, than for the Comparative Examples, which were in a powdered condition. Total discharge capacity was greatest at a factor of 1.18 (a 18% increase), the effective discharge capacity was greatest at a factor of 1.21 (a 21% increase), the total discharge efficiency was greatest at a factor of 1.07 (a

TABLE 3

|  | [1] | [2] | [3] | A mAh/g | B mAh/g | C mAh/g | D mAh/g | K (B/A) % | K (C/D) % |
| --- | --- | --- | --- | --- | --- | --- | --- | --- | --- |
| Comparative Example 4 | powder | 1100 | no | 669 | 437 | 212 | 399 | 65.3 | 53.1 |
| Example 10 | sheet | 1100 | no | 731 | 485 | 249 | 447 | 66.3 | 55.7 |
| Comparative Example 5 | powder | 800 | yes | 775 | 570 | 256 | 511 | 73.5 | 50.1 |
| Comparative Example 6 | powder | 1000 | yes | 721 | 567 | 330 | 541 | 78.6 | 61.0 |
| Comparative Example 7 | powder | 1200 | yes | 505 | 408 | 223 | 390 | 80.8 | 57.2 |
| Example 11 | sheet | 800 | yes | 860 | 671 | 307 | 592 | 78.0 | 51.9 |
| Example 12 | sheet | 1000 | yes | 782 | 651 | 397 | 606 | 83.2 | 65.5 |
| Example 13 | sheet | 1200 | yes | 553 | 476 | 270 | 460 | 86.1 | 58.7 |

Numbers in the Table
[1] Condition of the Carbon
[2] Temperature of the Heating in the Nitrogen Gas Current ° C.
[3] Pore Adjustment Treatment (Yes/No)

Table 4 shows the factor by which the performance improved for the Examples which were treated at carbonization temperature the same as the temperature of the heat treatment of the Comparative Examples.

7% increase), and the effective discharge ratio was greatest at a factor of 1.07 (a 7% increase).

TABLE 4

| Temperature of heating in nitrogen current | | Total Discharge Capacity | Effective Discharge Capacity | Total Discharge Efficiency | Effective Discharge Ratio |
| --- | --- | --- | --- | --- | --- |
| 1100° C. | Example 10/Comparative Example 4 | 1.11 | 1.17 | 1.02 | 1.05 |
| 800° C. | Example 11/Comparative Example 5 | 1.18 | 1.20 | 1.06 | 1.04 |
| 1000° C. | Example 12/Comparative Example 6 | 1.15 | 1.20 | 1.06 | 1.07 |
| 1200° C. | Example 13/Comparative Example 7 | 1.17 | 1.21 | 1.07 | 1.03 |

For situations in which a pore adjustment was not conducted, compared with the powder product of Comparative Example 4, the disk shaped molded carbon article of Example 10 had a total discharge capacity of 1.11 times (an 11% increase) that of the powder product of Comparative Example 4, an effective discharge capacity of 1.17 times (a 17% increase) that of the powder product of Comparative Example 4, a total discharge efficiency of 1.02 times (a 2% increase) that of the powder product of Comparative Example 4, and an effective discharge ratio of 1.05 times (a 5% increase) that of the powder product of Comparative Example 4.

Figure 12:
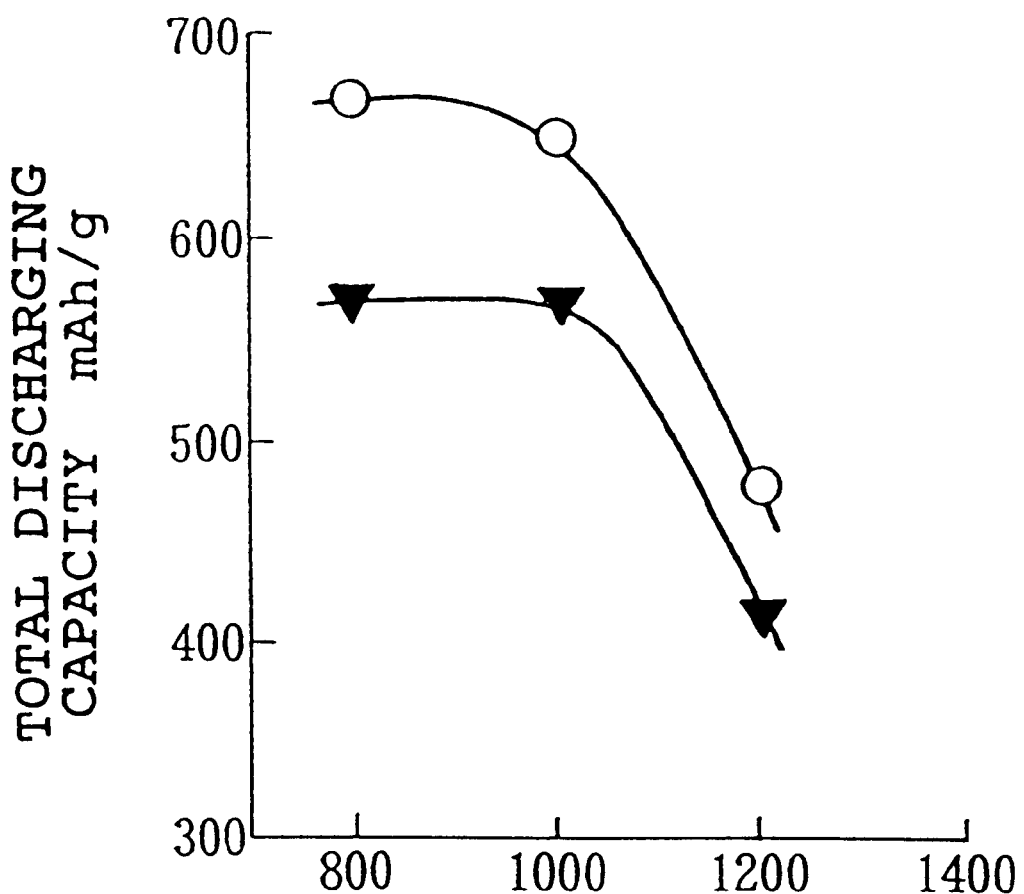
FIG. 12 is a graph showing the relationship between the temperature of the heating conducted in nitrogen gas and the total discharge capacity.
Figure 13:
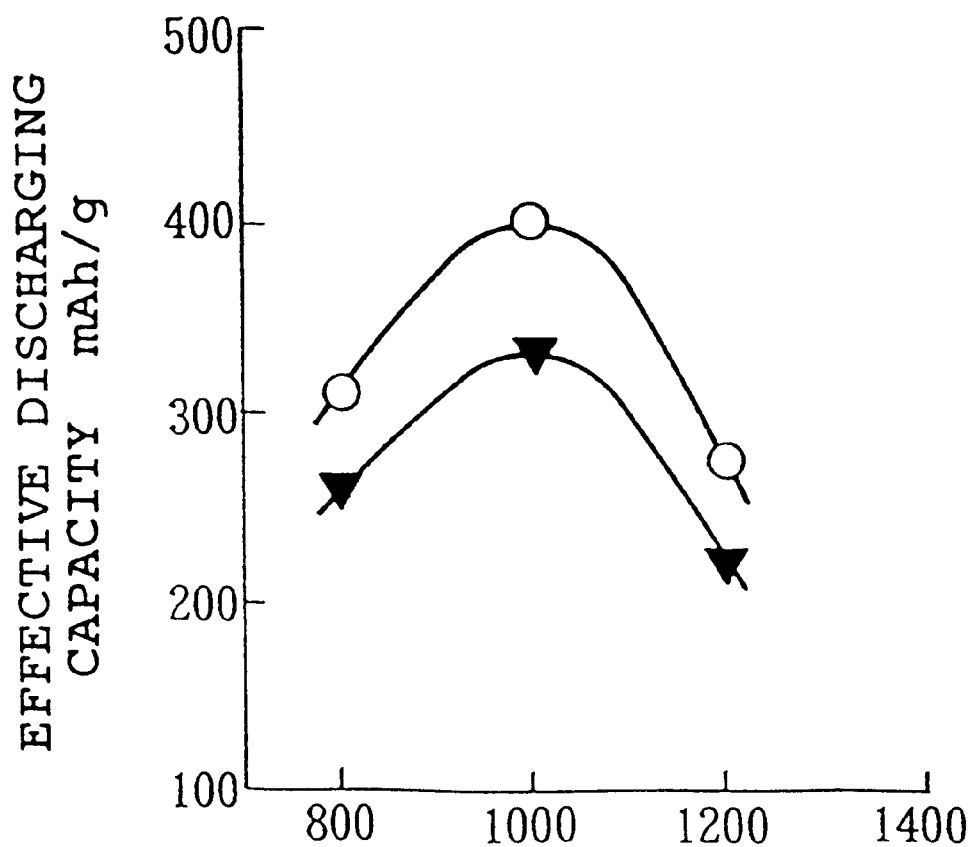
FIG. 13 is a graph showing the relationship between the temperature of the heating conducted in nitrogen gas and the effective discharge capacity.
Figure 14:
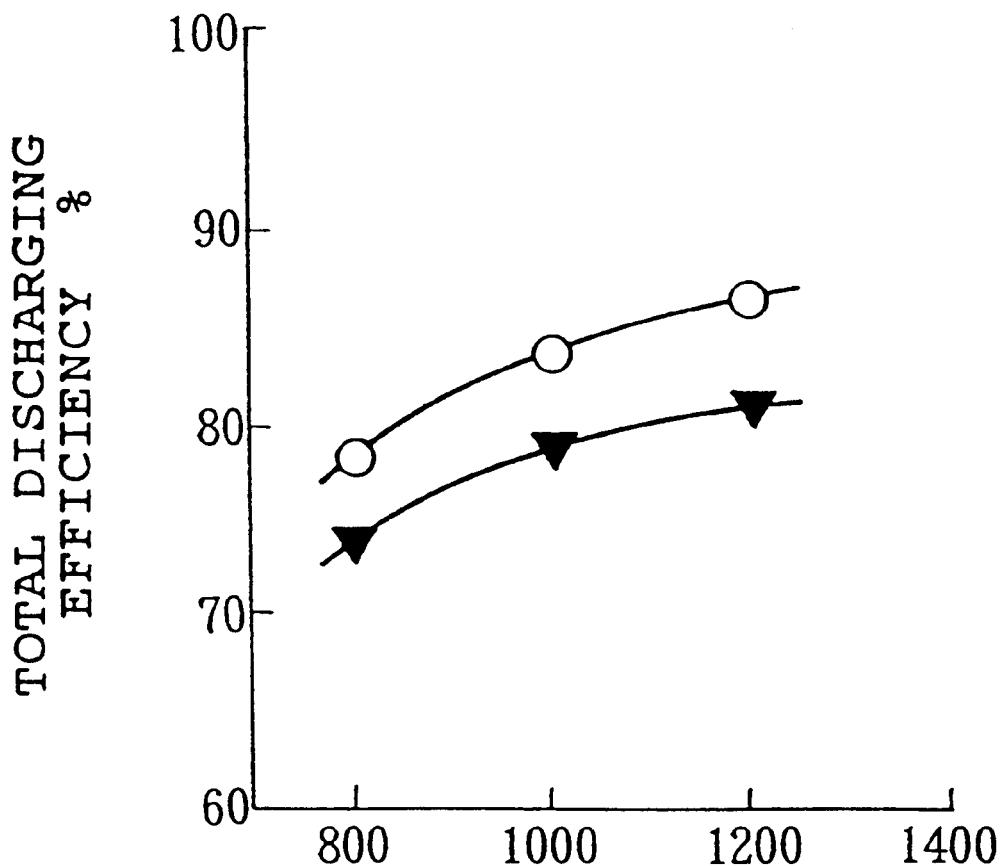
FIG. 14 is a graph showing the relationship between the temperature of the heating conducted in nitrogen gas and the total discharge efficiency.
Figure 14:
Figure 14:
Figure 15:
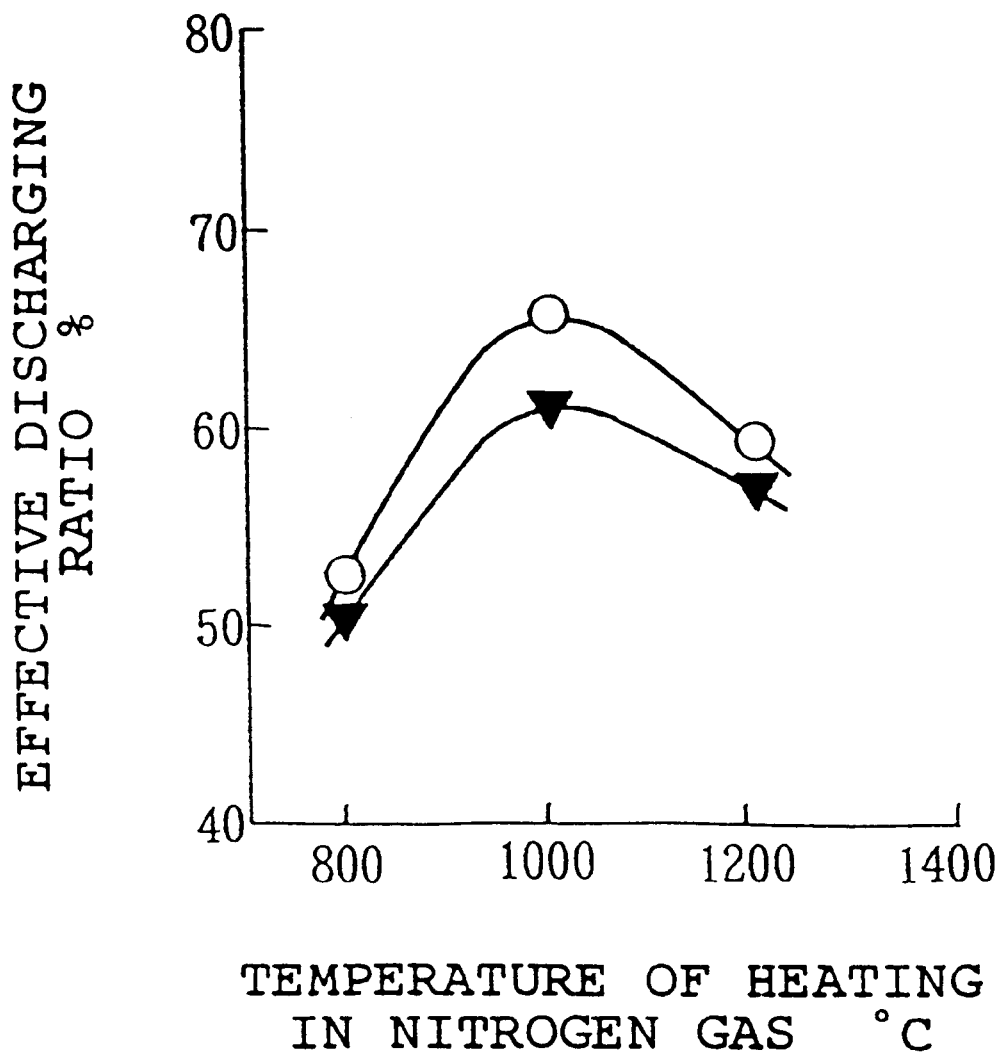
FIG. 15 is a graph showing the relationship between the temperature of the heating conducted in nitrogen gas and the effective discharge ratio.

When a pore adjustment treatment was conducted, and when comparing situations in which the heating treatment or Data for the Examples according to the second mode and for the Comparative Examples are shown in FIG. 12 (total discharge capacity), FIG. 13 (effective discharge capacity), FIG. 14 (total discharge efficiency), and FIG. 15 (effective discharge rate). As shown in these figures, when comparing Examples and Comparative Examples which have the same treatment temperatures, the Examples show greater values than those of the Comparative Examples.

Coin shaped lithium secondary batteries like the one shown in FIG. 11 were manufactured using carbon manufactured according to Examples 10~13.

The results from examination of the charging and discharging characteristics of these lithium secondary batteries by means of the above-mentioned battery charging and discharging tests confirmed performance improvements the same as those obtained for the above-mentioned evaluation cell.

EXAMPLES ACCORDING TO THE THIRD MODE

In Examples 14~16, carbon for a battery was manufactured by a process of chlorination→crushing→molding→

(no carbonization)→low temperature dechlorination→high temperature dechlorination→pore adjustment. In Examples 17 and 18, carbon for a battery was manufactured by a process of chlorination→crushing→molding→carbonization→high temperature dechlorination→low temperature dechlorination→pore adjustment. In Examples 19~21, carbon for a battery was manufactured by a process of chlorination→crushing→molding→carbonization→low temperature dechlorination→high temperature dechlorination→pore adjustment. In Example 22, carbon for a battery was manufactured by a process of bromination→crushing→molding→(no carbonization)→low temperature debromination→high temperature debromination→pore adjustment. In Examples 23 and 24, carbon for a battery was manufactured by a process of bromination→crushing→molding→carbonization→low temperature debromination→high temperature debromination→pore adjustment. In Examples 25~27, carbon for a battery was manufactured by a process of crushing→molding→chlorination→high temperature dechlorination→low temperature dechlorination→pore adjustment. In Example 28, carbon for a battery was manufactured by a process of crushing→molding→bromination→high temperature debromination→low temperature debromination→pore adjustment.

On the other hand, in Comparative Examples 8~10, carbon for a battery was manufactured by a process of (no chlorination)→crushing→molding→carbonization→heat treatment→pore adjustment. In Comparative Examples 11~13, carbon for a battery was manufactured by a process of chlorination→low temperature dechlorination→high temperature dechlorination→crushing→pore adjustment.

As the starting material dry-distilled charcoal, the dry-distilled charcoal of the Examples of the above-mentioned first mode was used.

Halogen Treatment

In the halogen treatment, dry-distilled charcoal starting material (approximately 15 g) or a molded article which had been carbonized again after the molding treatment was heat-treated for 2 hours at 600° C. under a current of nitrogen gas (2.7 NL/min) containing chlorine at 5% by volume or bromine at 5% by volume.

The low temperature dehalogenation was conducted by means of a heat treatment for 30 minutes at a temperature of 700° C. under a current of nitrogen gas (3 NL/min) which had been saturated with steam at 25° C., or which contained methane at 40% by volume. In addition, in one Example, it was conducted by a heat treatment for 30 minutes at a temperature of 1000° C. in a current of nitrogen gas (3 NL/min) which contained hydrogen at 50% by volume.

The high temperature dehalogenation was conducted by means of a heat treatment for 60 minutes at a temperature of 800° C., 1000° C. or 1200° C. under a current of nitrogen gas (3 NL/min).

These treatments were all conducted under conditions of approximately atmospheric pressure. After the dehalogenation treatment, the carbon for a battery was preserved in dry argon gas.

Molding Treatment (Examples 14~28 and Comparative Examples 8~10)

The molding treatment was conducted in the following way. 100 parts by weight of powdered dry-distilled charcoal or powdered halogenated dry-distilled charcoal, and 15 parts by weight of phenol resin and 8 parts by weight of ethanol added thereto were kneaded, in addition, this was impregnated with 20 parts of liquid paraffin and kneaded, and then press molded at a pressure of 500 kgf/cm². This was hardened by drying for 1 hour at 160° C. The press molding equipment used was a RIKEN POWER D3.5-300 model manufactured by Riken Seiki (Ltd). The shape of the molded article was 30×30×1 mm. The weight of the molded product was approximately 1.2 g.

Carbonization Treatment (Examples 17~21, 23~24, and Comparative Examples 8~10)

Under a nitrogen gas current (3 NL/min) of approximately atmospheric pressure, the molded article was raised to a temperature of 700° C. at a heating rate of 200° C./h, and then maintained at that temperature for 20 minutes.

Processing of the Molded Article (Example 14~28 and Comparative Examples 8~10)

In dry argon gas, dehalogenation treated carbon was cut into a disk of 10 mm in diameter, and ground to a thickness of 0.2 mm. After that, and until the pore adjustment treatment, the carbon was preserved in dry argon gas.

Pore Adjustment Treatment

In the pore adjustment of Examples 14~28 and Comparative Examples 8~10, the carbon (molded carbon article) which had been given a dehalogenation treatment was made into a disk of a predetermined size, and given a heat treatment for 10 minutes at a temperature of 900° C. in a current of nitrogen gas (3 NL/min) which had been saturated with benzene at 25° C.

In the pore adjustment of Examples 11~13, powder of an average particle size of several μm to several 10 s of μm was made by a crushing treatment, and then treated under the same conditions as mentioned above.

The pore adjustment was also conducted under conditions of approximately atmospheric pressure. After the pore adjustment the carbon was preserved in dry argon gas.

Manufacture of Carbon for Battery (Comparative Examples 11~13, Powdered Product)

Carbon for a battery (in a disk shape of 10 mm in diameter and 0.2 mm in thickness) was made by making powdered carbon which had been given a pore adjustment into a paste by the addition of polyvinyl fluoride equivalent to 9% by weight of carbon as a binding agent, and, additionally, by the addition of N-methyl-2-pyrrolidone, and making this into a sheet on a stainless steel plate for collecting electrode use. These operations were conducted in dry argon gas.

The evaluation tests for charging and discharging capacity were the same as the those for the Examples of the first mode.

The above-mentioned chlorine (and bromine) treatment, carbonization, and pore adjustment treatment used the same equipment as that used in the Examples of the above-mentioned first mode.

When conducting the chlorination (or bromination) treatment using this equipment, nitrogen gas is run from pipe 15 at a predetermined rate and chlorine (or bromine) gas is run from pipe 16 at a predetermined rate. In the low temperature dechlorination (debromination) treatment, gas containing steam, methane or hydrogen is run from pipe 16 at a predetermined rate. In the high temperature dechlorination (debromination) treatment, nitrogen gas is run from pipe 15 at a predetermined rate. In the pore adjustment treatment, gas containing thermally decomposable hydrocarbon is run from pipe 16 at a predetermined rate.

The density and the pore volume of the molded article were measured by means of the same method as that of the Examples of the second mode.

COMPARATIVE EXAMPLE 8

No Chlorine Treatment, 800° C. Heat Treatment, Molded Article

Dry distilled charcoal was crushed, organic binding agent added thereto, and then molded, next, the organic binding agent was carbonized by heating under a current of nitrogen gas. Next, it was given a heat treatment at a temperature of 800° C. under a current of nitrogen gas, and then ground to make a disk shaped carbonaceous material. In addition, a pore adjustment treatment was conducted, carbon for a battery was made, and the charging and discharging characteristic measured. The results were A=860 mAh/g, B=671 mAh/g, C=307 mAh/g, and D=592 mAh/g. The total discharge efficiency K(B/A) equals 78.0%, and the effective discharge ratio K(C/D) equals 51.9%. The density of the heat-treated molded article was 0.80 g/cm$^3$, and the pore volume was 0.18 cm$^3$/g. The density of the molded article of the carbon for a battery which was given a pore adjustment treatment was 0.81 g/cm$^3$.

COMPARATIVE EXAMPLE 9

No Chlorine Treatment, 1000° C. Heat Treatment, Molded Article

This was conducted under the same conditions as Comparative Example 8 with the exception that the temperature of the heat treatment in nitrogen gas was 1000° C. The charging and discharging characteristics were measured. The results were A=782 mAh/g, B=651 mAh/g, C=397 mAh/g, and D=606 mAh/g. The total discharge efficiency K(B/A) equals 83.2%, and the effective discharge ratio K(C/D) equals 65.5%. The density of the heat-treated molded article was 0.83 g/cm$^3$, and the pore volume was 0.19 cm$^3$/g. The density of the molded article of the carbon for a battery which was given a pore adjustment treatment was 0.84 g/cm$^3$.

COMPARATIVE EXAMPLE 10

No Chlorine Treatment, 1200° C. Heat Treatment, Molded Article

This was conducted under the same conditions as Comparative Example 8 with the exception that the temperature of the heat treatment under a nitrogen gas current was 1200° C. The charging and discharging characteristics were measured. The results were A=553 mAh/g, B=476 mAh/g, C=270 mAh/g, and D=460 mAh/g. The total discharge efficiency K(B/A) equals 86.1%, and the effective discharge ratio K(C/D) equals 58.7%. The density of the heat-treated molded article was 0.86 g/cm$^3$, and the pore volume was 0.19 cm$^3$/g. The density of the molded article of the carbon for a battery which was given a pore adjustment treatment was 0.87 g/cm$^3$.

COMPARATIVE EXAMPLE 11

Chlorine Treatment, Steam Dechlorination, 800° C. High Temperature Dechlorination Treatment, Powdered Product Dry distilled charcoal was chlorinated and then dechlorinated (low temperature dechlorination treatment) by heating under a current of nitrogen gas which contained steam, next it was given a heat treatment (high temperature dechlorination treatment) at a temperature of 800° C. under a current of nitrogen gas. This was crushed, and a pore adjustment treatment conducted on the powdered carbon. A binding agent was added to this carbon to make carbon for a battery, and the charging and discharging characteristics were measured using an evaluation cell. The results were A=778 mAh/g, B=622 mAh/g, C=316 mAh/g, and D=567 mAh/g. The total discharge efficiency K(B/A) equals 79.9%, and the effective discharge ratio K(C/D) equals 55.7%.

COMPARATIVE EXAMPLE 12

Chlorine Treatment, methane Dechlorination, 1000° C. High Temperature Dechlorination, Powdered Product This was conducted under the same conditions as in Comparative Example 11 with the exceptions that the dechlorination (low temperature dechlorination treatment) was a heat treatment in a nitrogen current which contained methane, and that the temperature of the heating (high temperature dechlorination treatment) in a nitrogen gas current was 1000° C. The charging and discharging characteristics were measured. The results were A=771 mAh/g, B=679 mAh/g, C=440 mAh/g, and D=658 mAh/g. The total discharge efficiency K(B/A) equals 88.1%, and the effective discharge ratio K(C/D) equals 66.9%.

COMPARATIVE EXAMPLE 13

Chlorine Treatment, Steam Dechlorination, 1200° C. High Temperature Dechlorination, Powdered Product This was conducted under the same conditions as in Comparative Example 11 with the exception that the temperature of the heat treatment (high temperature dechlorination treatment) in a current of nitrogen gas was 1200° C. The charging and discharging characteristics were measured. The results were A=554 mAh/g, B=471 mAh/g, C=284 mAh/g, and D=445 mAh/g. The total discharge efficiency K(B/A) equals 85.0%, and the effective discharge ratio K(C/D) equals 63.8%.

EXAMPLE 14

Chlorine Treatment, Steam Dechlorination, 800° C. High Temperature Dechlorination, Molded Article Chlorination treated dry-distilled charcoal was crushed, a binding agent added thereto, and then molded, next, it was dechlorinated (low temperature dechlorination treatment) by heating under a current of nitrogen gas which contained steam. Next, it was heated (high temperature dechlorination treatment) at a temperature of 800° C. under a current of nitrogen gas, and then ground to make a disk shaped carbonaceous material. Carbon for a battery was made by additionally conducting a pore adjustment treatment. The charging and discharging characteristics of this carbon for a electrode were measured using a evaluation cell. The results were A=867 mAh/g, B=682 mAh/g, C=341 mAh/g, and D=609 mAh/g. The total discharge efficiency K(B/A) equals 78.7%, and the effective discharge ratio K(C/D) equals 56.0%.

EXAMPLE 15

Chlorine Treatment, Steam Dechlorination, 1000° C. High Temperature Dechlorination, Molded Article This was conducted under the same conditions as Example 14 with the exception that the temperature of the heating (high temperature dechlorination treatment) in the nitrogen gas current was 1000° C. The charging and discharging characteristics were measured. The results were A=858 mAh/g, B=760 mAh/g, C=501 mAh/g, and D=719 mAh/g. The total discharge efficiency K(B/A) equals 88.6%, and the effective discharge ratio K(C/D) equals 69.7%.

EXAMPLE 16

Chlorine Treatment, Steam Dechlorination, 1200° C. High Temperature Dechlorination, Molded Article This was conducted under the same conditions as Example 14 with the exception that the temperature of the heating (high temperature dechlorination treatment) in the nitrogen gas current was 1200° C. The charging and discharging characteristics were measured. The results were A=635 mAh/g, B=559 mAh/g, C=375 mAh/g, and D=532 mAh/g. The total discharge efficiency K(B/A) equals 88.0%, and the effective discharge ratio K(C/D) equals 70.5%.

EXAMPLE 17

Chlorine Treatment, 1000° C. High Temperature Dechlorination, Steam Dechlorination, Molded Article Chlorination treated dry-distilled charcoal was crushed, a binding agent added thereto, and molded, then it was carbonized by heating under a current of nitrogen gas. The carbonized molded article was heated (high temperature dechlorination treatment) at a temperature of 1000° C. under a current of nitrogen gas, next, it was dechlorinated (low temperature dechlorination treatment) by heating under a current of nitrogen gas which contained steam, and then ground to make a disk shaped carbonaceous material. Carbon for a battery was made by additionally conducting a pore adjustment treatment. The charging and discharging characteristics of this carbon for a battery were measured using an evaluation cell. The results were A=862 mAh/g, B=782 mAh/g, C=528 mAh/g, and D=741 mAh/g. The total discharge efficiency K(B/A) equals 90.7%, and the effective discharge ratio K(C/D) equals 71.3%. The density of the dechlorination treated molded article was 0.86 g/cm$^3$, and the pore volume was 0.26 cm$^3$/g. The density of the molded article of the carbon for a battery which was given the pore adjustment treatment was 0.88 g/cm$^3$.

EXAMPLE 18

Chlorine Treatment, 1000° C. High Temperature Dechlorination, Hydrogen Gas Dechlorination, Molded Article Chlorination treated dry-distilled charcoal was crushed, a binding agent added thereto, and molded, then it was carbonized by heating under a current of nitrogen gas. The carbonized molded article was heat-treated (high temperature dechlorination treatment) at a temperature of 1000° C. under a current of nitrogen gas, next, it was heated (low temperature dechlorination treatment) for 30 minutes at a temperature of 1000° C. in a gas mixture of hydrogen gas at 50% by volume and nitrogen gas at 50% by volume, and then ground to make a disk shaped carbonaceous material. Carbon for a battery was made by additionally conducting a pore adjustment treatment. The charging and discharging characteristics of this carbon for a battery were measured using an evaluation cell. The results were A=862 mAh/g, B=781 mAh/g, C=530 mAh/g, and D=740 mAh/g. The total discharge efficiency K(B/A) equals 90.6%, and the effective discharge ratio K(C/D) equals 71.6%. The density of the dechlorination treated molded article was 0.86 g/cm$^3$, and the pore volume was 0.26 cm$^3$/g. The density of the molded article of the carbon for a battery which was given the pore adjustment treatment was 0.88 g/cm$^3$.

EXAMPLE 19

Chlorine Treatment, Steam Dechlorination, 800° C. High Temperature Dechlorination, Molded Article Chlorination treated dry-distilled charcoal was crushed, a binding agent added thereto, and molded, then, it was carbonized by heating under a current of nitrogen gas. The carbonized molded article was dechlorinated (low temperature dechlorination treatment) by heating under a current of nitrogen gas which contained steam, next, it was heat-treated (high temperature dechlorination treatment) at a temperature of 800° C. under a current of nitrogen gas, and then ground to make a disk shaped carbonaceous material. Carbon for a battery was made by additionally conducting a pore adjustment treatment. The charging and discharging characteristics of this carbon for a battery were measured using an evaluation cell. The results were A=872 mAh/g, B=698 mAh/g, C=373 mAh/g, and D=625 mAh/g. The total discharge efficiency K(B/A) equals 80.0%, and the effective discharge ratio K(C/D) equals 59.7%. The density of the dechlorination treated molded article was 0.85 g/cm$^3$, and the pore volume was 0.28 cm$^3$/g. The density of the molded article of the carbon for a battery which was given the pore adjustment treatment was 0.86 g/cm$^3$.

EXAMPLE 20

Chlorine Treatment, Methane Dechlorination, 1000° C. High Temperature Dechlorination, Molded Article This was conducted under the same conditions as Example 19 with the exceptions that the dechlorination (low temperature dechlorination treatment) was conducted by heating under a current of nitrogen gas which contained methane, and that the temperature of the heating (high temperature dechlorination treatment) in a nitrogen gas current was 1000° C. The charging and discharging characteristics were measured. The results were A=863 mAh/g, B=784 mAh/g, C=531 mAh/g, and D=744 mAh/g. The total discharge efficiency K(B/A) equals 90.8%, and the effective discharge ratio K(C/D) equals 71.4%. The density of the dechlorination treated molded article was 0.86 g/cm$^3$, and the pore volume was 0.28 cm$^3$/g. The density of the molded article of the carbon for a battery which was given the pore adjustment treatment was 0.88 g/cm$^3$.

EXAMPLE 21

Chlorine Treatment, Steam Dechlorination, 1200° C. High Temperature Dechlorination, Molded Article This was conducted under the same conditions as Example 19 with the exception that the temperature of the heating (high temperature dechlorination treatment) in a nitrogen gas current was 1200° C. The charging and discharging characteristics were measured. The results were A=640 mAh/g, B=580 mAh/g, C=393 mAh/g, and D=553 mAh/g. The total discharge efficiency K(B/A) equals 90.6%, and the effective discharge ratio K(C/D) equals 71.1%. The density of the dechlorination treated molded article was 0.87 g/cm$^3$, and the pore volume was 0.27 cm$^3$/g. The density of the molded article of the carbon for a battery which was given the pore adjustment treatment was 0.88 g/cm$^3$.

EXAMPLE 22

Bromination Treatment, 1000° C. High Temperature Debromination, Molded Article

Dry distilled charcoal was bromination treated by heating for 2 hours at a temperature of 600° C. under a current of nitrogen gas which contained bromine at 5% by volume. The brominated dry-distilled charcoal was crushed, a binding agent added, and molded. Next, it was heated (low temperature debromination treatment) at a temperature of 700° C. under a current of nitrogen gas which contained steam, and additionally heated (high temperature debromination treatment) at a temperature of 1000° C. under a current of nitrogen gas. Next, from this, a disk shaped carbonaceous material was manufactured, and carbon for a battery was made by conducting a pore adjustment treatment. The charging and discharging characteristics were measured. The results were A=865 mAh/g, B=766 mAh/g, C=509 mAh/g, and D=725 mAh/g. The total discharge efficiency K(B/A) equals 88.6%, and the effective discharge ratio K(C/D) equals 70.2%. Good charging and discharging characteristics were also obtained by conducting a bromination treatment. The density of the molded article of the carbon for a battery which was given the pore adjustment treatment was 0.89 g/cm$^3$.

EXAMPLE 23

Bromination Treatment, 800° C. High Temperature Debromination, Molded Article

Dry distilled charcoal was bromination treated by heating for 2 hours at a temperature of 600° C. under a current of nitrogen gas which contained bromine at 5% by volume. The brominated dry-distilled charcoal was crushed, a binding agent added, and molded; then it was carbonized under a current of nitrogen gas. The carbonized molded article was debrominated (low temperature debromination treatment) by heating for 30 minutes at a temperature of 700° C. under a current of nitrogen gas which had been saturated with steam at 25° C. Next, it was heated (high temperature debromination treatment) at a temperature of 800° C. under a current of nitrogen gas. From this, a disk shaped carbonaceous material was manufactured, and carbon for a battery was made by conducting a pore adjustment treatment. The charging and discharging characteristics of this carbon were measured. The results were A=869 mAh/g, B=695 mAh/g, C=371 mAh/g, and D=622 mAh/g. The total discharge efficiency K(B/A) equals 80.0%, and the effective discharge ratio K(C/D) equals 59.6%. Good charging and discharging characteristics were also obtained by conducting a bromination treatment. The density of the molded article of the carbon for a battery which was given the pore adjustment treatment was 0.87 g/cm$^3$.

EXAMPLE 24

Bromination Treatment, 1000° C. High Temperature Debromination, Molded Article

Carbon for a battery was manufactured under the same conditions as Example 23 with the exception that the temperature of the heating (high temperature debromination treatment) under a current of nitrogen gas was 1000° C. The results of the measurement of the charging and discharging characteristics were A=869 mAh/g, B=790 mAh/g, C=539 mAh/g, and D=751 mAh/g. The total discharge efficiency K(B/A) equals 90.9%, and the effective discharge ratio K(C/D) equals 71.8%. Good charging and discharging efficiencies were also obtained by conducting a bromination treatment. The density of the molded article of the carbon for a battery which was given the pore adjustment treatment was 0.89 g/cm$^3$.

EXAMPLE 25

Molded Article, Chlorination Treatment, 800° C. High Temperature Dechlorination

Dry distilled charcoal was crushed, an organic binding agent added thereto, and molded; next a second dry distillation was conducted in which the organic binding agent was carbonized under a current of nitrogen gas by raising the temperature to 600° C. at a rate of 100° C./h. Next, it was chlorinated by a heat treatment for 2 hours at a temperature of 600° C. under a current of nitrogen gas which contained chlorine at 5% by volume. Next it was heated (high temperature dechlorination treatment) at a temperature of 800° C. under a current of nitrogen gas, and then dechlorinated (low temperature dechlorination treatment) by heating at 700° C. under a current of nitrogen gas which contained steam. This was ground to make a disk shaped carbonaceous material, and then given a pore adjustment treatment. The results of the measurement of the charging and discharging characteristics were A=854 mAh/g, B=679 mAh/g, C=360 mAh/g, and D=628 mAh/g. The total discharge efficiency K(B/A) equals 79.5%, and the effective discharge ratio K(C/D) equals 57.3%.

Good efficiency was also obtained by conducting a chlorination treatment a molded article.

EXAMPLE 26

Molded Article, Chlorination Treatment, 1000° C. High Temperature Dechlorination Dry distilled charcoal was crushed, an organic binding agent added thereto, and molded; next a second dry distillation was conducted in which the organic binding agent was carbonized under a current of nitrogen gas by raising the temperature to 600° C. at a rate of 100° C./h. Next, it was chlorinated by a heat treatment for 2 hours at a temperature of 600° C. under a current of nitrogen gas which contained chlorine at 5% by volume. Next it was heated (high temperature dechlorination treatment) at 1000° C. under a current of nitrogen gas, and then dechlorinated (low temperature dechlorination treatment) by heating at 700° C. under a current of nitrogen gas which contained steam. This was ground to make a disk shaped carbonaceous material, and then given a pore adjustment treatment. The results of the measurement of the charging and discharging characteristics were A=841 mAh/g, B=751 mAh/g, C=501 mAh/g, and D=715 mAh/g. The total discharge efficiency K(B/A) equals 89.3%, and the effective discharge ratio K(C/D) equals 70.1%.

Good performance was also obtained by conducting a chlorination treatment a molded article.

EXAMPLE 27

Molded Article, Chlorination Treatment, 1200° C. High Temperature Dechlorination Dry distilled charcoal was crushed, an organic binding agent added thereto, and molded; next, a second dry distillation was conducted in which the organic binding agent was carbonized under a current of nitrogen gas by raising the temperature to 600° C. at a rate of 100° C./h. Next, it was chlorinated by a heat treatment for 2 hours at a temperature of 600° C. under a current of nitrogen gas which contained chlorine at 5% by volume. Next it was heated (high temperature dechlorination treatment) at 1200° C. under a current of nitrogen gas, and then dechlorinated (low temperature dechlorination treatment) by heating at 700° C. under a current of nitrogen gas which contained steam. This was ground to make a disk shaped carbonaceous material, and then given a pore adjustment treatment. The results of the measurement of the charging and discharging characteristics were A=631 mAh/g, B=564 mAh/g, C=374 mAh/g, and D=534 mAh/g. The total discharge efficiency K(B/A) equals 89.4%, and the effective discharge ratio K(C/D) equals 70.0%.

Good performance was also obtained by conducting a chlorination treatment a molded article.

EXAMPLE 28

Molded Article, Bromination Treatment, 1000° C. High Temperature Debromination

Dry distilled charcoal was crushed, an organic binding agent added thereto, and molded; next, a second dry distillation was conducted in which the organic binding agent was carbonized under a current of nitrogen gas by raising the temperature to 600° C. at a rate of 100° C./h. Next, it was brominated by a heat treatment for 2 hours at a temperature of 600° C. under a current of nitrogen gas which contained bromine at 5% by volume. Next it was heated (high temperature debromination treatment) at 1000° C. under a current of nitrogen gas, and then debrominated (low temperature debromination treatment) by heating at 700° C. under a current of nitrogen gas which contained steam. This was ground to make a disk shaped carbonaceous material, and then given a pore adjustment treatment. The results of the measurement of the charging and discharging characteristics were A=845 mAh/g, B=756 mAh/g, C=508 mAh/g, and D=720 mAh/g. The total discharge efficiency K(B/A) equals 89.5%, and the effective discharge ratio K(C/D) equals 70.6%.

Good performance was also obtained by conducting a bromination treatment on a molded article.

The treatment conditions and the charging and discharging characteristics of Comparative Examples 8~13 and Examples 14~28 are shown in Table 5. In Table 5, A represents total charging capacity, B represents total discharge capacity, C represents effective discharge capacity, D represents fixed current discharging capacity, K(B/A) represents total discharge efficiency, and K(C/D) represents effective discharge ratio.

Table 6 shows the factor by which the performance improved for the Examples (molded articles) with regard to the Comparative Examples (molded articles) which were not chlorination treated.

When comparing situations having the same heat treatment temperature, each of the total discharge-capacity, the effective discharge capacity, the total discharge efficiency and the effective discharge ratio were better for Examples 19~21, in which dry-distilled charcoal was made into molded articles after the chlorination treatment, than for the Comparative Examples 8~10, in which dry-distilled charcoal was made into molded articles without conducting a chlorination treatment. Total discharge capacity was greatest at a factor of 1.22 (a 22% increase), the effective discharge capacity was greatest at a factor of 1.46 (a 46% increase), the total discharge efficiency was greatest at a factor of 1.09 (a 9% increase), and the effective discharge ratio was greatest at a factor of 1.21 (a 21% increase).

TABLE 5

| [1] | [2] | [3] | [4] | [5] | [6] °C. | A mAh/g | B mAh/g | C mAh/g | D mAh/g | K (B/A) % | K (C/D) % |
|---|---|---|---|---|---|---|---|---|---|---|---|
| Comparative Example 8 | sheet | none | — | yes | 800 | 860 | 671 | 307 | 592 | 78.0 | 51.9 |
| Comparative Example 9 | sheet | none | — | yes | 1000 | 782 | 651 | 397 | 606 | 83.2 | 65.5 |
| Comparative Example 10 | sheet | none | — | yes | 1200 | 553 | 476 | 270 | 460 | 86.1 | 58.7 |
| Comparative Example 11 | powder | chlorine | steam | — | 800 | 778 | 622 | 316 | 567 | 79.9 | 55.7 |
| Comparative Example 12 | powder | chlorine | methane | — | 1000 | 771 | 679 | 440 | 658 | 88.1 | 66.9 |
| Comparative Example 13 | powder | chlorine | steam | — | 1200 | 554 | 471 | 284 | 445 | 85.0 | 63.8 |
| Example 14 | sheet | chlorine | steam | no | 800 | 867 | 682 | 341 | 609 | 78.7 | 56.0 |
| Example 15 | sheet | chlorine | steam | no | 1000 | 858 | 760 | 501 | 719 | 88.6 | 69.7 |
| Example 16 | sheet | chlorine | steam | no | 1200 | 635 | 559 | 375 | 532 | 88.0 | 70.5 |
| Example 17 | sheet | chlorine | steam | yes | 1000 | 862 | 782 | 528 | 741 | 90.7 | 71.3 |
| Example 18 | sheet | chlorine | hydrogen | yes | 1000 | 862 | 781 | 530 | 740 | 90.6 | 71.6 |
| Example 19 | sheet | chlorine | steam | yes | 800 | 872 | 698 | 373 | 625 | 80.0 | 59.7 |
| Example 20 | sheet | chlorine | methane | yes | 1000 | 863 | 784 | 531 | 744 | 90.8 | 71.4 |
| Example 21 | sheet | chlorine | steam | yes | 1200 | 640 | 580 | 393 | 553 | 90.6 | 71.1 |
| Example 22 | sheet | bromine | steam | no | 1000 | 865 | 766 | 509 | 725 | 88.6 | 70.2 |
| Example 23 | sheet | bromine | steam | yes | 800 | 869 | 695 | 371 | 622 | 80.0 | 59.6 |
| Example 24 | sheet | bromine | steam | yes | 1000 | 869 | 790 | 539 | 751 | 90.9 | 71.8 |
| Example 25 | sheet | chlorine | steam | no | 800 | 854 | 679 | 360 | 628 | 79.5 | 57.3 |
| Example 26 | sheet | chlorine | steam | no | 1000 | 841 | 751 | 501 | 715 | 89.3 | 70.1 |
| Example 27 | sheet | chlorine | steam | no | 1200 | 631 | 564 | 374 | 534 | 89.4 | 70.0 |
| Example 28 | sheet | bromine | steam | no | 1000 | 845 | 756 | 508 | 720 | 89.5 | 70.6 |

Numbers in the Table
[1] The Number of the Comparative Example or Example
[2] Condition of the Carbonaceous Material
[3] Type of Halogenation Treatment
[4] Atmosphere of the Low Temperature Dehalogenation
[5] Carbonization Treatment (Yes/No)
[6] Temperature of the Heating in Nitrogen Gas Current ° C.

TABLE 6

| Temperature of heating in nitrogen gas current | | Total Discharge Capacity | Effective Discharge Capacity | Total Discharge Efficiency | Effective Discharge Ratio |
|---|---|---|---|---|---|
| 800° C. | Example 19/Comparative Example 8 | 1.04 | 1.21 | 1.03 | 1.15 |
| 1000° C. | Example 20/Comparative Example 9 | 1.20 | 1.34 | 1.09 | 1.09 |
| 1200° C. | Example 21/Comparative Example 10 | 1.22 | 1.46 | 1.05 | 1.21 |

Table 7 shows the factor by which efficiency improved for the Examples (molded articles) with regard to the Comparative Examples (powdered product).

When comparing situations having the same temperature for the heat treatment, each of the total discharge capacity, the effective discharge capacity, the total discharge efficiency and the effective discharge ratio were better for Examples 19~21, in which carbon for a battery was made into disk shaped molded articles, than for the Comparative Examples in which the powder was used as it was. Total discharge capacity was greatest at a factor of 1.23 (a 23% increase), the effective discharge capacity was greatest at a factor of 1.38 (a 38% increase), the total discharge efficiency was greatest at a factor of 1.07 (a 7% increase), and the effective discharge ratio was greatest at a factor of 1.11 (a 11% increase).

and 18 are approximately the same as the data of Example 20, the data of Examples 25~27 are approximately the same as the data of Examples 14 to 16 respectively, and the data of Example 28 is approximately the same as the data of Example 22, they have been omitted from FIGS. 16~19 for the purpose of simplifying the graphs.

As shown in these figures, when comparing Examples and Comparative Examples which have the same temperature for the heat treatment under a nitrogen gas current, the Examples show greater values for all of the total discharge capacity (B), effective discharge capacity (C), total discharge efficiency (K(B/A)), and effective discharge rate (K(C/D)) than those of the Comparative Examples.

Coin shaped lithium secondary batteries like the one shown in FIG. 11 were manufactured using carbon manufactured according to Examples 14 to 28.

TABLE 7

| Temperature of heating in nitrogen gas current | | Total Discharge Capacity | Effective Discharge Capacity | Total Discharge Efficiency | Effective Discharge Ratio |
|---|---|---|---|---|---|
| 800° C. | Example 19/Comparative Example 11 | 1.12 | 1.18 | 1.00 | 1.07 |
| 1000° C. | Example 20/Comparative Example 12 | 1.15 | 1.21 | 1.03 | 1.07 |
| 1200° C. | Example 21/Comparative Example 13 | 1.23 | 1.38 | 1.07 | 1.11 |

Table 8 shows the changes in performance when comparing the molded articles which were not given a carbonization treatment (Examples 14~16) and the molded articles which were given a carbonization treatment (Examples 19~21) for situations which had the same heating temperature under a nitrogen gas current.

When the carbonization treatment is omitted, there is some reduction in performance for each of the total discharge capacity, the effective discharge capacity, the total discharge efficiency, and the effective discharge ratio when compared with situations in which a carbonization treatment was conducted. However, when compared with the powder product or with the molded article which was not given the chlorine treatment, the efficiencies improved.

The results from examination of the charging and discharging characteristics of these lithium secondary batteries by means of the above-mentioned charging and discharging tests for batteries confirmed performance improvements the same as those obtained for the above-mentioned evaluation cell.

INDUSTRIAL APPLICABILITY

As explained above, by means of the present invention, it is possible to provide a superior carbon for a lithium secondary battery which has high total discharge capacity, high effective discharge capacity, high total discharge efficiency, and high effective discharge rate when used in a carbon electrode of a lithium secondary battery. In addition,

TABLE 8

| Temperature of heating in nitrogen gas current | | Total Discharge Capacity | Effective Discharge Capacity | Total Discharge Efficiency | Effective Discharge Ratio |
|---|---|---|---|---|---|
| 800° C. | Example 19/Comparative Example 14 | 1.02 | 1.09 | 1.02 | 1.07 |
| 1000° C. | Example 20/Comparative Example 15 | 1.03 | 1.06 | 1.02 | 1.02 |
| 1200° C. | Example 21/Comparative Example 16 | 1.04 | 1.05 | 1.03 | 1.01 |

Figure 16:
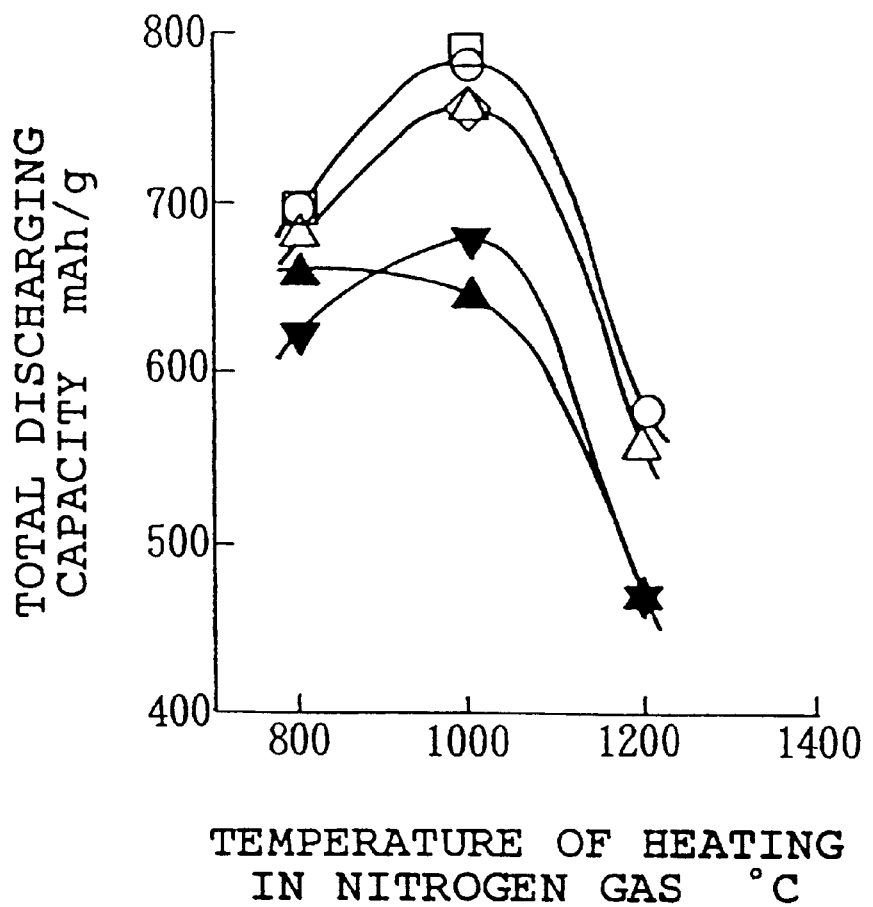
FIG. 16 is a graph showing the relationship between the temperature of the heating conducted in nitrogen gas and the total discharge capacity.
Figure 17:
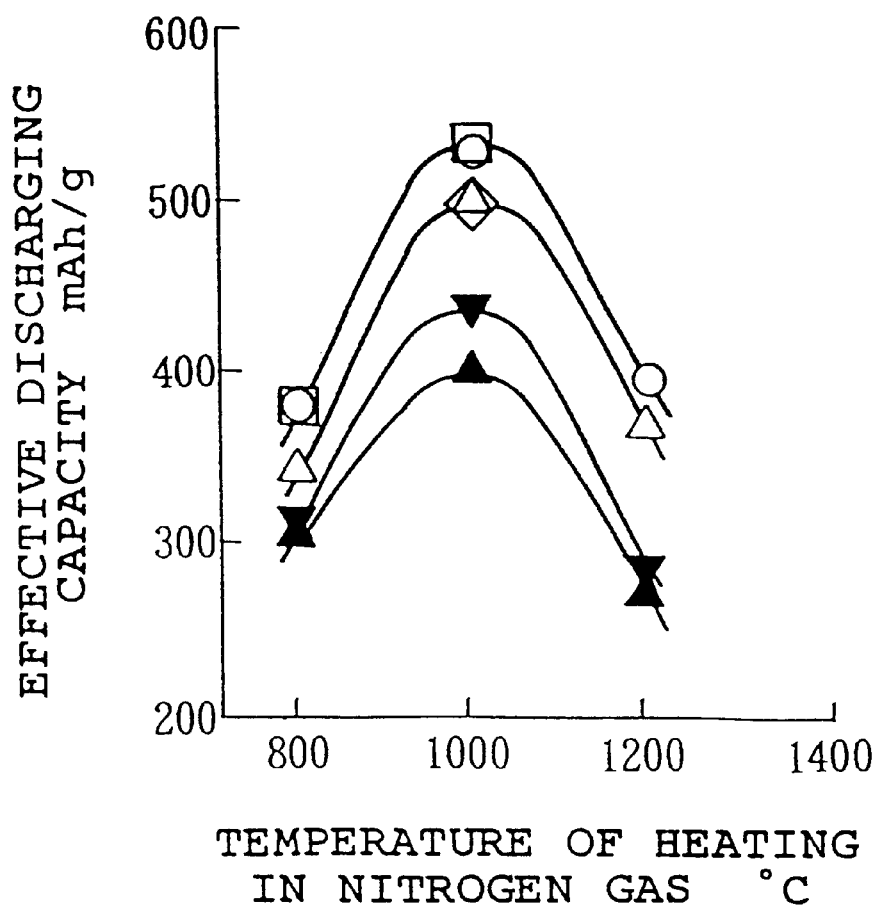
FIG. 17 is a graph showing the relationship between the temperature of the heating conducted in nitrogen gas and the effective discharge capacity.
Figure 17:
Figure 17:
Figure 17:
Figure 17:
Figure 17:
Figure 17:
Figure 18:
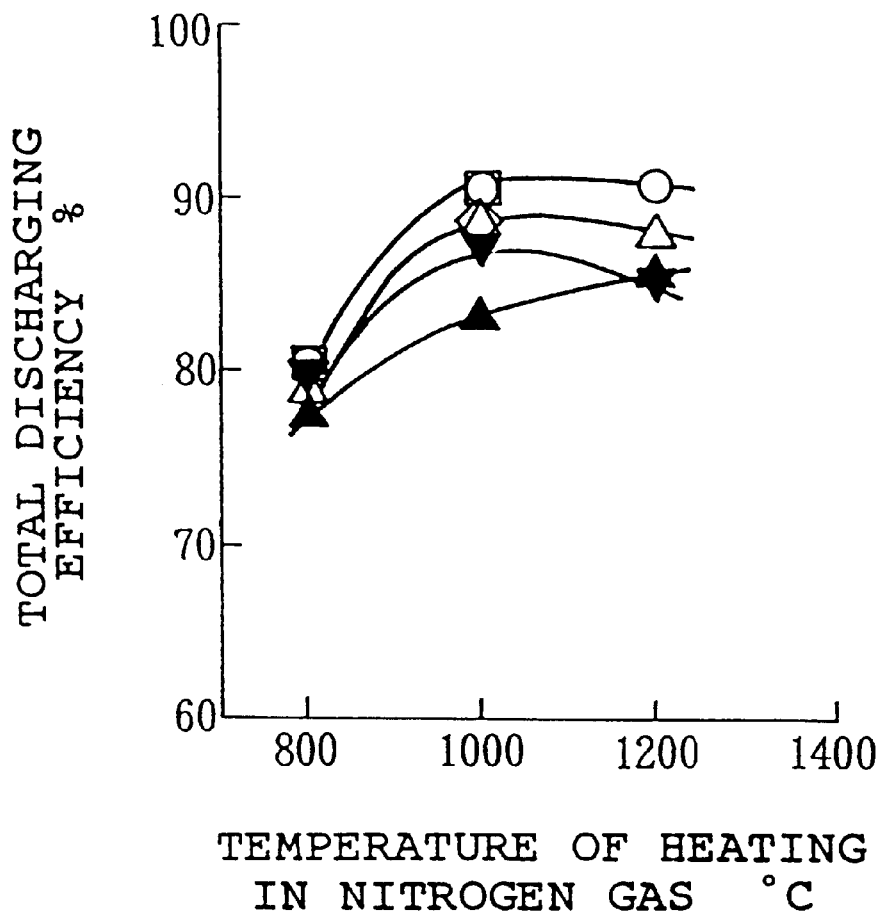
FIG. 18 is a graph showing the relationship between the temperature of the heating conducted in nitrogen gas and the total discharge efficiency.
Figure 19:
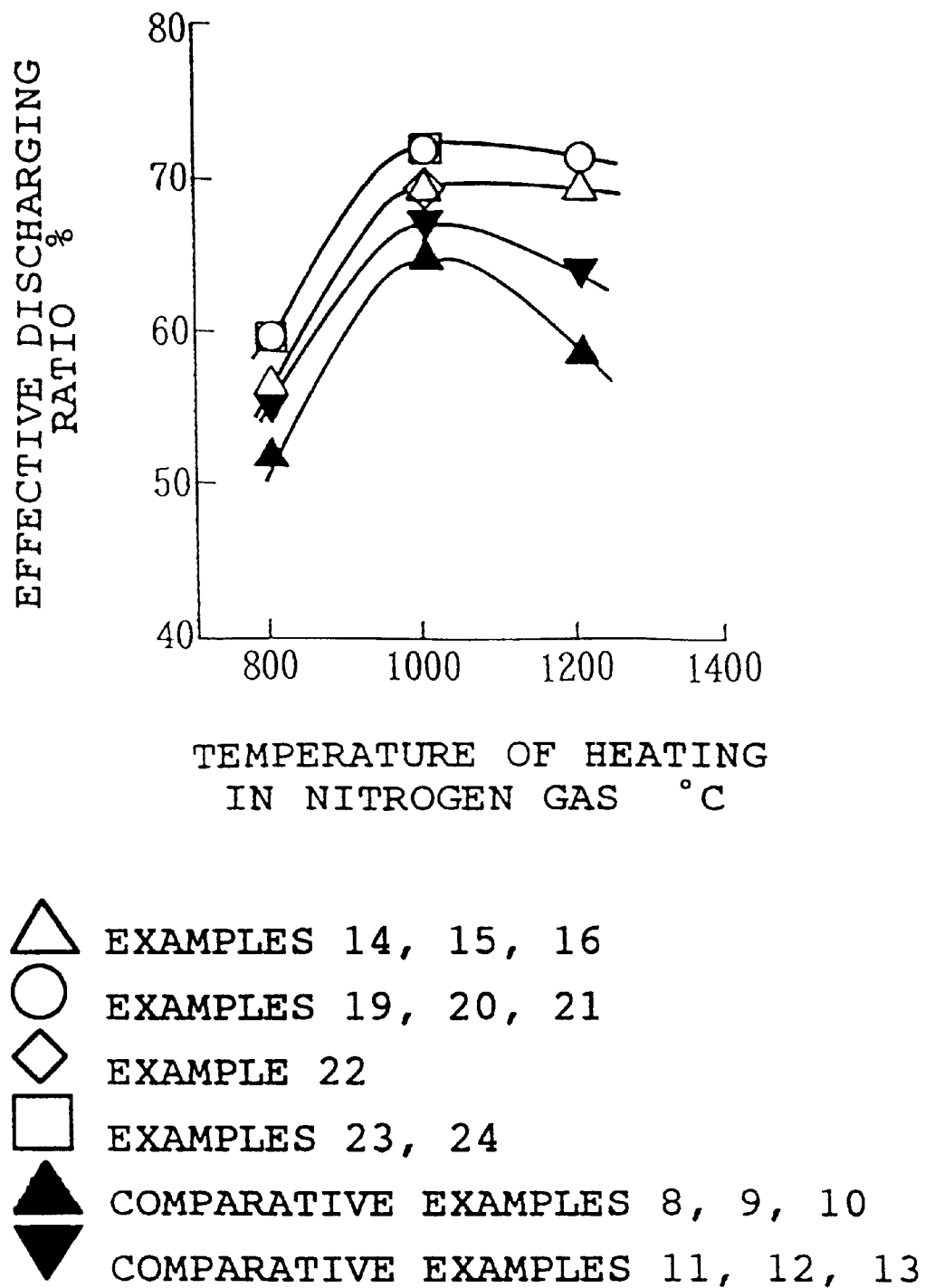
FIG. 19 is a graph showing the relationship between the temperature of the heating conducted in nitrogen gas and the effective discharge ratio.

Data for the Examples according to the third mode and for the Comparative Examples are shown in FIG. 16 (total discharge capacity), FIG. 17 (effective discharge capacity), FIG. 18 (total discharge efficiency), and FIG. 19 (effective discharge rate). In addition, since the data of Examples 17 by means of the present invention, it is possible to provide a superior lithium secondary battery which has high total discharge capacity, high effective discharge capacity, high total discharge efficiency, and high effective discharge rate.

We claim:

1. A method of manufacturing a carbon for a lithium secondary battery, comprising:

contacting a dry-distilled charcoal with a gas which contains chlorine thereby providing a chlorinated dry-distilled charcoal;

removing a portion or all of said chlorine in said chlorinated dry-distilled charcoal thereby effecting dechlorination of the treated charcoal; and thermally decomposing said chlorinated charcoal in the presence of a thermally decomposable hydrocarbon, thereby adjusting the pores of the carbon product prepared.

2. A method of manufacturing a carbon for a lithium secondary battery according to claim 1, wherein said dry-distilled charcoal is a dry-distilled phenol resin.

3. A method of manufacturing a carbon for a lithium secondary battery according to claim 1, wherein said chlorination step is a heat treatment conducted at a temperature of 350–1000° C. in a gas which contains chlorine diluted with an inert gas.

4. A method of manufacturing a carbon for a lithium secondary battery according to claim 1, wherein said dechlorination step is effected by at least one dechlorination treatment selected from the group consisting of:

a) heating said chlorinated dry-distilled charcoal at a temperature of 700–1400° C. in an inert gas or under vacuum evacuation;

b) heating said chlorinated dry-distilled charcoal at a temperature of 600–850° C. in the presence of a lower hydrocarbon having no more than 4 carbon atoms or steam which has been diluted with an inert gas; or c) heating said chlorinated dry-distilled charcoal at a temperature of 1600–1400° C. in a hydrogen gas which has been diluted with an inert gas.

5. A method of manufacturing a carbon for a lithium secondary battery according to claim 4, wherein said dechlorination treatment is selected from the group consisting of:

i) conducting said treatment a);

ii) conducting said treatment b) or c);

iii) conducting said treatment a), and, thereafter, said treatment b) or said treatment c); or iv) conducting said treatment b) or said treatment c), and, thereafter, conducting said treatment a).

6. A method of manufacturing a carbon for a lithium secondary battery according to claim 1, comprising, after said dechlorination step, crushing said dechlorinated charcoal and then subsequently conducting said pore adjustment step.

7. A method of manufacturing a carbon for a lithium secondary battery according to claim 1, wherein said pore adjustment step is a heat treatment conducted at a temperature of 600–1100° C. in a thermally decomposable hydrocarbon diluted with inert gas.

8. A method of manufacturing a carbon for a lithium secondary battery according to claim 7, wherein said thermally decomposable hydrocarbon generates carbon when thermally decomposed and is at least one hydrocarbon selected from the group consisting of aromatic hydrocarbons, cyclic hydrocarbons, saturated chain hydrocarbons, and unsaturated chain hydrocarbons.

9. A method of manufacturing a carbon for a lithium secondary battery according to claim 1, wherein from the completion of said dechlorination step to the beginning of said pore adjustment step, said dechlorination treated carbon is handled in an inert gas.

10. A method of manufacturing a carbon for a lithium secondary battery according to claim 1, comprising:

molding a mixture of said dry-distilled charcoal or said chlorinated charcoal with an organic binding agent.

11. A method of manufacturing a carbon for a lithium secondary battery according to claim 10, wherein said molding is conducted by molding a mixture of said dry-distilled charcoal and an organic binding agent, and thereafter;

conducting a second dry-distillation step by heating said molded dry-distilled charcoal in an inert gas thereby resulting in carbonization of the organic binding agent of the molded material; and then conducting said chlorination step after the second dry-distillation step.

12. A method of manufacturing a carbon for a lithium secondary battery according to claim 10, wherein said molding is conducted by:

molding a mixture of said chlorinated dry-distilled charcoal and an organic binding agent, and thereafter dechlorinating the molded material.

13. A method of manufacturing a carbon for a lithium secondary battery according to claim 12, wherein said dechlorination step is a heat treatment in which the rate of temperature increase is 20–500° C./h.

14. A method of manufacturing a carbon for a lithium secondary battery according to claim 12, comprising:

heating said molded material thereby carbonizing the organic binding agent of the molded material.

15. A method of manufacturing a carbon for a lithium secondary battery according to claim 14, wherein said carbonization step is a heat treatment in which heating is conducted in an inert gas at a temperature of 450–1300° C. with a rate of temperature increase of 20–500° C./h.

16. A carbon for a lithium secondary battery prepared by the process of claim 1.

17. A carbon for a lithium secondary battery according to claim 16 having a density of 0.7–1.2 g/cm$^3$.

18. A method of manufacturing a lithium secondary battery containing a carbon electrode, a lithium electrode and an electrolytic solution provided between the electrodes, comprising:

assembling the said components of said lithium secondary battery under a dried inert gas using the carbon material of claim 16 as said carbon electrode.

19. A lithium secondary battery comprising a carbon electrode, a lithium electrode, and an electrolytic solution provided between said electrodes, wherein said carbon electrode is a carbon for a lithium secondary battery according to claim 16.

* * * * *